United States Patent
Satpathy et al.

(10) Patent No.: US 12,361,596 B2
(45) Date of Patent: Jul. 15, 2025

(54) PIXEL BLOCK ENCODER CAPABLE OF JOINTLY ENCODING PIXEL CHANNELS

(71) Applicant: Meta Platforms Technologies, LLC, Menlo Park, CA (US)

(72) Inventors: Sudhir Satpathy, Redmond, WA (US); Zhi Zhou, Issaquah, WA (US); Richard Lawrence Greene, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 292 days.

(21) Appl. No.: 17/860,829

(22) Filed: Jul. 8, 2022

(65) Prior Publication Data
US 2024/0013443 A1    Jan. 11, 2024

(51) Int. Cl.
*G06T 9/00* (2006.01)
*G06T 3/40* (2024.01)
*G06T 19/00* (2011.01)

(52) U.S. Cl.
CPC .............. *G06T 9/001* (2013.01); *G06T 3/40* (2013.01); *G06T 19/006* (2013.01)

(58) Field of Classification Search
CPC ......... G06T 9/001; G06T 3/40; G06T 19/006; H04N 19/136; H04N 19/176; H04N 19/186; H04N 19/60; H04N 19/103
See application file for complete search history.

(56) References Cited

U.S. PATENT DOCUMENTS

| | | | |
|---|---|---|---|
| 2016/0014421 A1* | 1/2016 | Cote | H04N 19/14 382/170 |
| 2020/0204819 A1* | 6/2020 | Hsieh | H04N 19/70 |
| 2022/0198716 A1 | 6/2022 | Chang et al. | |

OTHER PUBLICATIONS

European Search Report for European Patent Application No. 23183540.6, dated Nov. 27, 2023, 5 pages.
Kiran R., et al., "Region Based Medical Image Compression using Block-Based PCA," 2016 International Conference on Computation of Power, Energy Information and Communication (ICCPEIC), IEEE, Apr. 20, 2016, pp. 91-96.

* cited by examiner

*Primary Examiner* — Wassim Mahrouka
(74) *Attorney, Agent, or Firm* — Greenberg Traurig, , LLP

(57) ABSTRACT

In an embodiment, a system includes a buffer configured to store a plurality of pixel blocks of an image, a first processor unit configured to receive a pixel block of the of the plurality of pixel blocks and select whether to separately encode or jointly encode pixel components of the pixel block by computing eigenvalues for the pixel components, a second processor unit configured to compute, responsive to the first processing unit selecting to jointly encode the pixel block, (i) an eigenvector for the pixel components of the pixel block based on the eigenvalues and (ii) endpoints on the eigenvector for encoding the pixel components, an encoder unit configured to encode, responsive to the first processing unit selecting to jointly encode the pixel block, the pixel components of the pixel block jointly based on the eigenvector and the endpoints.

20 Claims, 24 Drawing Sheets

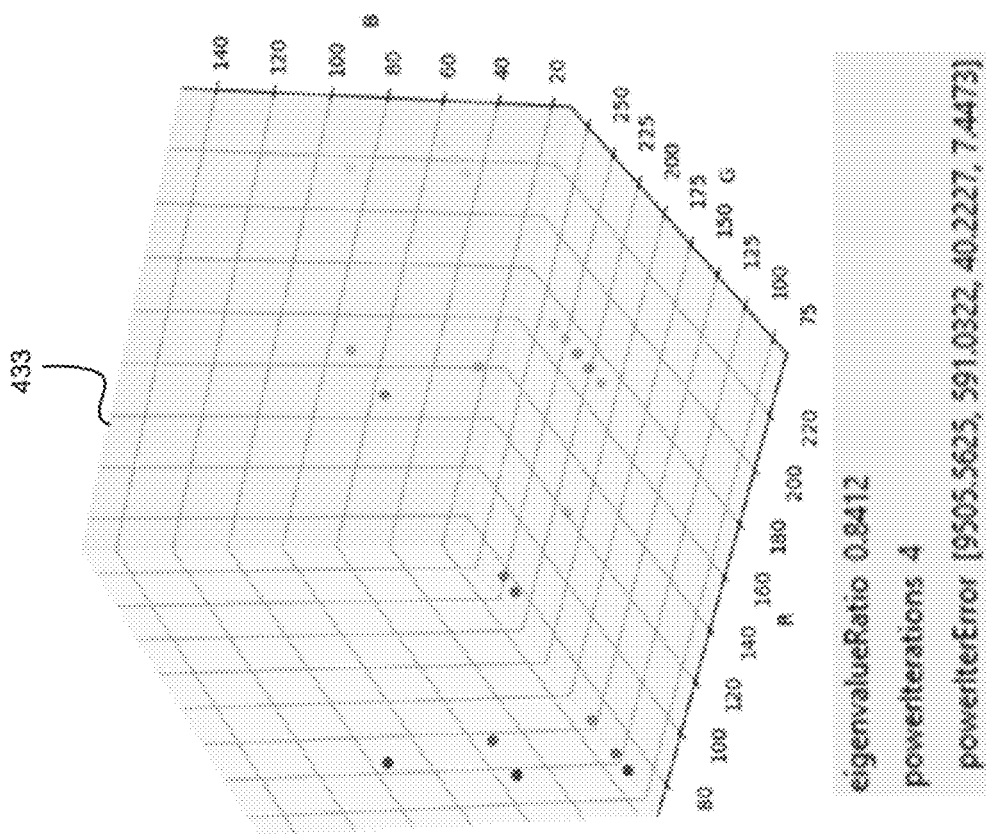
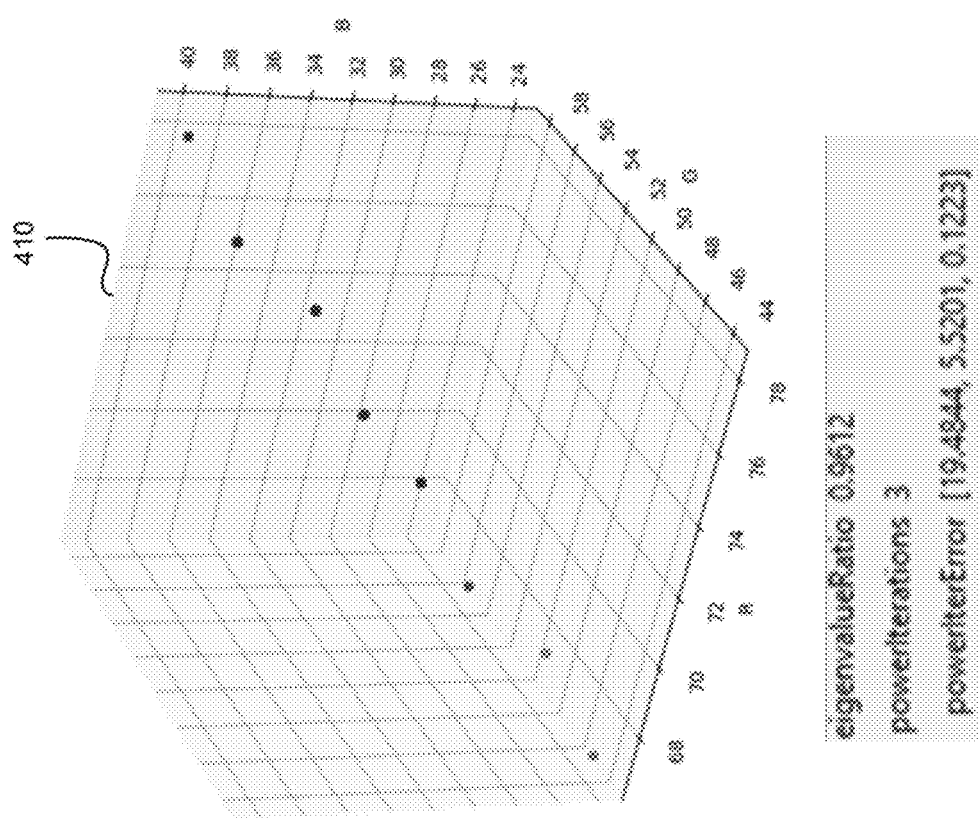
FIG. 4

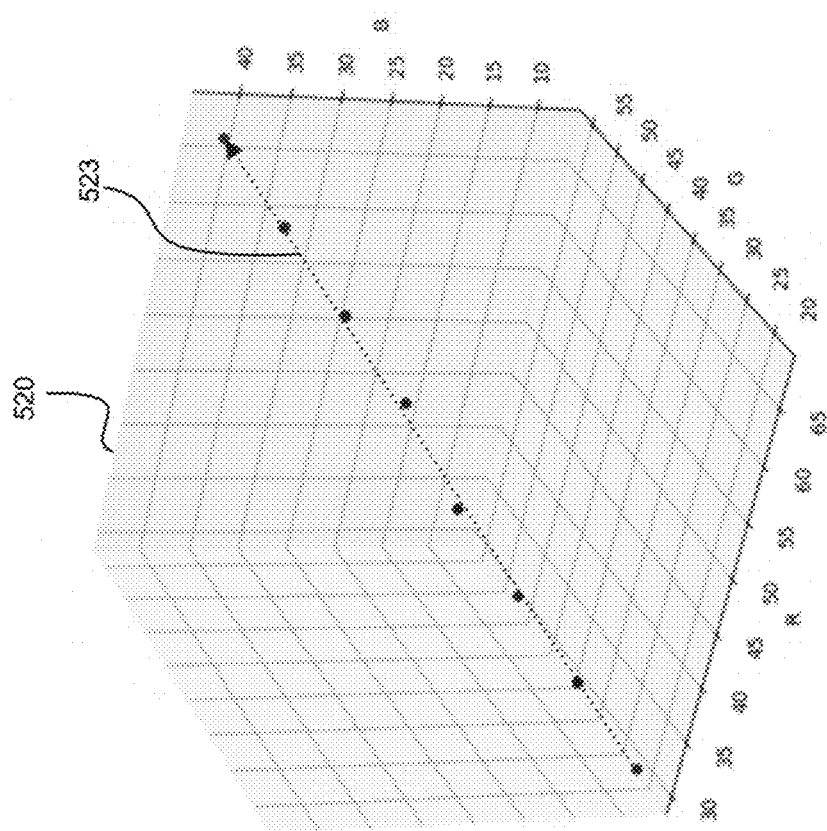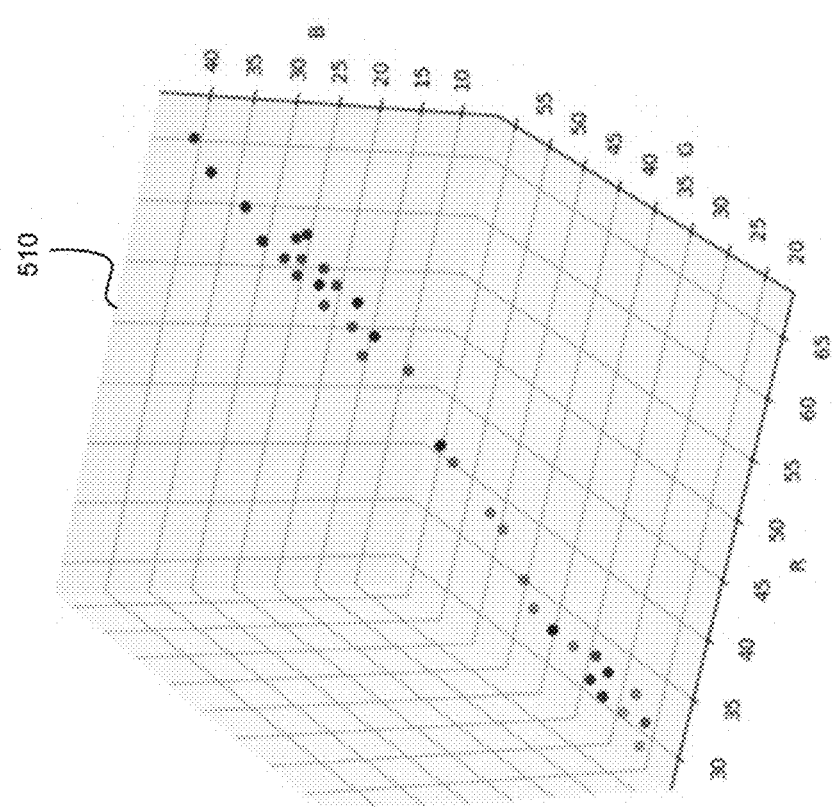
FIG. 5

912 — Color Variance: [3414, 2712, 3622]
914 — Desired Bit Allocation: [5,5,5]
916 — Initial Bit Allocation: [2,4,2]
Channel-Order: Blue -> Red -> Green With 0 bit credit, final bit allocation [2,4,2]
With 1 bit credit, final bit allocation [2,4,3]
With 2 bit credits, final bit allocation [3,4,3]
With 3 bit credits, final bit allocation [3,5,3]
With 4 bit credits, final bit allocation [3,5,4]
With 5 bit credits, final bit allocation [4,5,4]
With 6 bit credits, final bit allocation [4,5,5]
With 7 bit credits, final bit allocation [5,5,5]

*FIG. 9B*

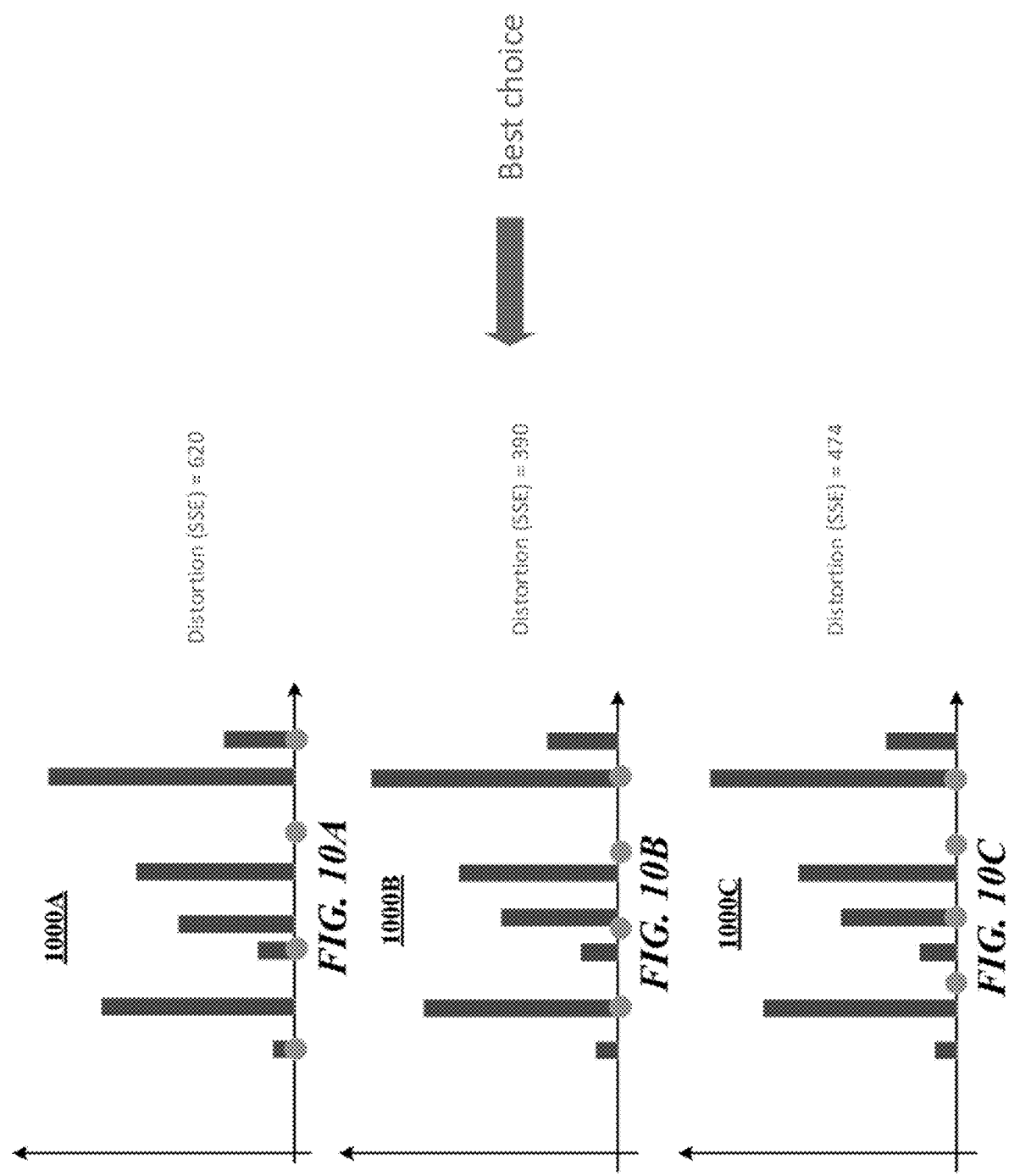

FIG. 11B

1135 Pixel Values (Decimal)

| 100 | 139 | 101 | 125 |
|-----|-----|-----|-----|
| 135 | 132 | 100 | 102 |
| 102 | 102 | 107 | 111 |
| 100 | 101 | 101 | 102 |

1137 Pixel Values (Binary)

| 01100100 | 10001011 | 01100101 | 01111101 |
|----------|----------|----------|----------|
| 10000111 | 10000100 | 01100100 | 01100110 |
| 01100110 | 01100110 | 01101011 | 01101111 |
| 01100100 | 01100101 | 01100101 | 01100110 |

=

Endpoints of actual pixel values (minimum to maximum): 100 – 139 (40 discrete pixel values)

Desired bit allocation: 6

Final bit allocation: 3

Number of quantization levels: 8

Number of binary bits required to represent eight quantization levels: 3

Scale: 5

⇒

1140

Map pixel values 100 – 104 (decimal) to Level 000 (binary)
Map pixel values 105 – 109 (decimal) to Level 001 (binary)
Map pixel values 110 – 114 (decimal) to Level 010 (binary)
Map pixel values 115 – 119 (decimal) to Level 011 (binary)
Map pixel values 120 – 124 (decimal) to Level 100 (binary)
Map pixel values 125 – 129 (decimal) to Level 101 (binary)
Map pixel values 130 – 134 (decimal) to Level 110 (binary)
Map pixel values 135 – 139 (decimal) to Level 111 (binary)

⇒

1145 Encoded Pixel Values (Binary)

| 000 | 111 | 000 | 101 |
|-----|-----|-----|-----|
| 111 | 110 | 010 | 011 |
| 011 | 000 | 001 | 010 |
| 101 | 000 | 101 | 010 |

1700

1701 temporarily storing, by each of a plurality of slots of a ring buffer, a pixel block of a plurality of pixels blocks of an image until the pixel block is encoded

1702 performing, by a plurality of processor units connected in series, different encoding operations in an encoding pipeline, each processor unit configured to selectively access the pixel block from a slot of the plurality of slots to determine characteristics of the accessed pixel block, wherein the plurality of processing units are configured to sequentially obtain access to a slot of the plurality of slots and concurrently process the pixel blocks stored in different ones of the plurality of slots

1703 selectively accessing and encoding, by an encoder unit, the pixel block stored in a slot of the plurality of slots based on the characteristics of the pixel block determined by the plurality of processing units

*FIG. 17*

PIXEL BLOCK ENCODER CAPABLE OF JOINTLY ENCODING PIXEL CHANNELS

TECHNICAL FIELD

This disclosure generally relates to data compression, and, more specifically, to an architecture of a pixel encoding system.

BACKGROUND

As digital media consumption increases so does the costs relating to memory or storage space and data transmission bandwidth. Thus, data compression is typically deployed as a conventional method for reducing data redundancy, and, by extension, reducing the consumption of memory or storage space and data transmission bandwidth. One particular type of data compression includes image data compression, in which image data is compressed by encoding an original image utilizing fewer bits than those utilized in the generation of the original image. In image data compression, the objective is to preserve most of the color information and other pertinent image information associated with the original image while mitigating the data redundancies. Desirably, any differences between the original image and the compressed image may be imperceptible to a user, for example, viewing the compressed image on a display. In this manner, the compressed image can then be stored and/or transmitted without an undesirable increase in costs such as memory or storage space and data transmission bandwidth. However, for certain types of images, utilizing conventional image data compression methods may lead to a decrease in the quality and perceptibility of the compressed image.

SUMMARY OF PARTICULAR EMBODIMENTS

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The present embodiments are directed to a modular architecture of a pixel block encoder that leverages a ring buffer to process multiple pixel blocks in parallel and reduce computational costs by minimizing the data movement of the pixel blocks. The block encoder comprises a ring buffer and multiple processing units. The ring buffer includes multiple slots, each slot being used to temporarily store data corresponding to a single pixel block while the block is processed and encoded. The data stored in each slot is piped into each of the processing units in any desired order, but particular embodiments envisions piping in a sequential manner. At any given time, the multiple processing units could be working on different slots, allowing parallel processing of multiple pixel blocks. The pixel data stored in the slots are stored in the same slot until the data is fully encoded, at which time new pixel data corresponding to a different pixel block may be stored in the slot.

The various processing units of the encoder include: a "block stats" unit that determines the statistical measurements of a pixel block (e.g., variance, channel priority) and the bit allocation of each channel of the pixel values; "endpoint" units that determine the optimal endpoints of the pixel encoding quantization levels (e.g., minimum and maximum values); and an "encode" unit that encodes each pixel in the pixel block based in part on the determined optimal endpoints. While the determinations of these processing units are communicated between each other (e.g., statistical measurements, optimal endpoints), there is no movement of pixel data between those processing units. Instead, the processing units access the pixel data that are stored in the slots to perform their respective analyses. This provides considerable reduction in computational costs by minimizing the overall data movement during the encoding process. In contrast, after the pixel block is encoded, the pixel data is transmitted to a "packetize" unit then to a "interleave" unit. The packetize unit assembles the encoded pixel data and corresponding header into packets. The interleave unit arranges the packets into a bitstream. In an embodiment, the "block stats" unit may maintain a credit-based system to adjust the bit allocations assigned to each channel of pixel values of the pixel block.

Particular embodiments disclosed herein are directed to image compression techniques that leverage strong RGB color correspondences between pixels in a pixel block. Conventional compression techniques are typically asynchronous, thus are too slow to allow real-time encoding and decoding. To allow images to be encoded/decoded faster, embodiments of this disclosure provide a method of selectively encoding certain pixel blocks of an image based on the concept of Principal Component Analysis if the color values within the block are highly correlated to each other. The high-level idea is that, if pixel color values within a block are highly correlated to each other, the color values for the entire block can be jointly encoded into a simplified representation that captures most of the color information. This technique, referred to as the joint-color mode, can be selectively applied to certain pixel blocks in an image if the block is suitable for the joint-color mode (e.g., high correlation of pixel color values), while the color channels of the other blocks are encoded separately, which may be referred hereinafter as the standard encoding method.

Principal Component Analysis (PCA) is a method used to reduce the dimensionality of large data sets, by transforming a large set of variables into a smaller one that still contains most of the information in the large set. Here, the disclosed embodiments provide techniques for determining whether the pixel color values within a block are highly correlated with each other using PCA to find the largest eigenvalue and the dominant eigenvector for the pixel block. If there is a sufficiently dominant eigenvector, the pixel color values within the block are highly correlated, which means that the color values of the block can be jointly encoded using the joint-color mode. If, however, the pixel color values in the block are not highly correlated, then the pixel color values are encoded separately (normal mode). However, in some embodiment, pixel blocks may not be encoded with the joint-color mode even if the color values of the block are highly correlated to each other, because if a block is comprised of over-exposed pixels (e.g., a block with high-contrast edges or a group of saturated pixel values (255)), the joint-color mode may not be able to accurately represent the color information of the block, thereby producing undesirable artifacts.

Particular embodiments disclosed herein are directed to the combination of the modular architecture of a pixel block encoder leveraging a ring buffer and the image compression techniques for jointly encoding pixel channels. One novel aspect of the combined encoder system is, amongst others, based on how the joint-color mode processes are separated and configured to fit within the various processing units of the encoder system. This technique allows the encoder system to determine at the earliest possible opportunity whether a pixel block should be encoded using the joint-color mode or the standard mode, while still maintaining the encoding efficiency provided by the encoder architecture.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 4 illustrates pixel color values of pixel blocks.
FIG. 5 illustrates pixel color values of pixel blocks.
FIGS. 9A-9B illustrate a diagram of example operations of a block stats unit.
FIGS. 10A-10C illustrate examples of RGB histograms.
FIGS. 11A-11B illustrate example processes of encoding a pixel block.
FIG. 17 illustrates an example method for encoding a pixel block using an encoder system.

DESCRIPTION OF EXAMPLE EMBODIMENTS

Figure 1A:
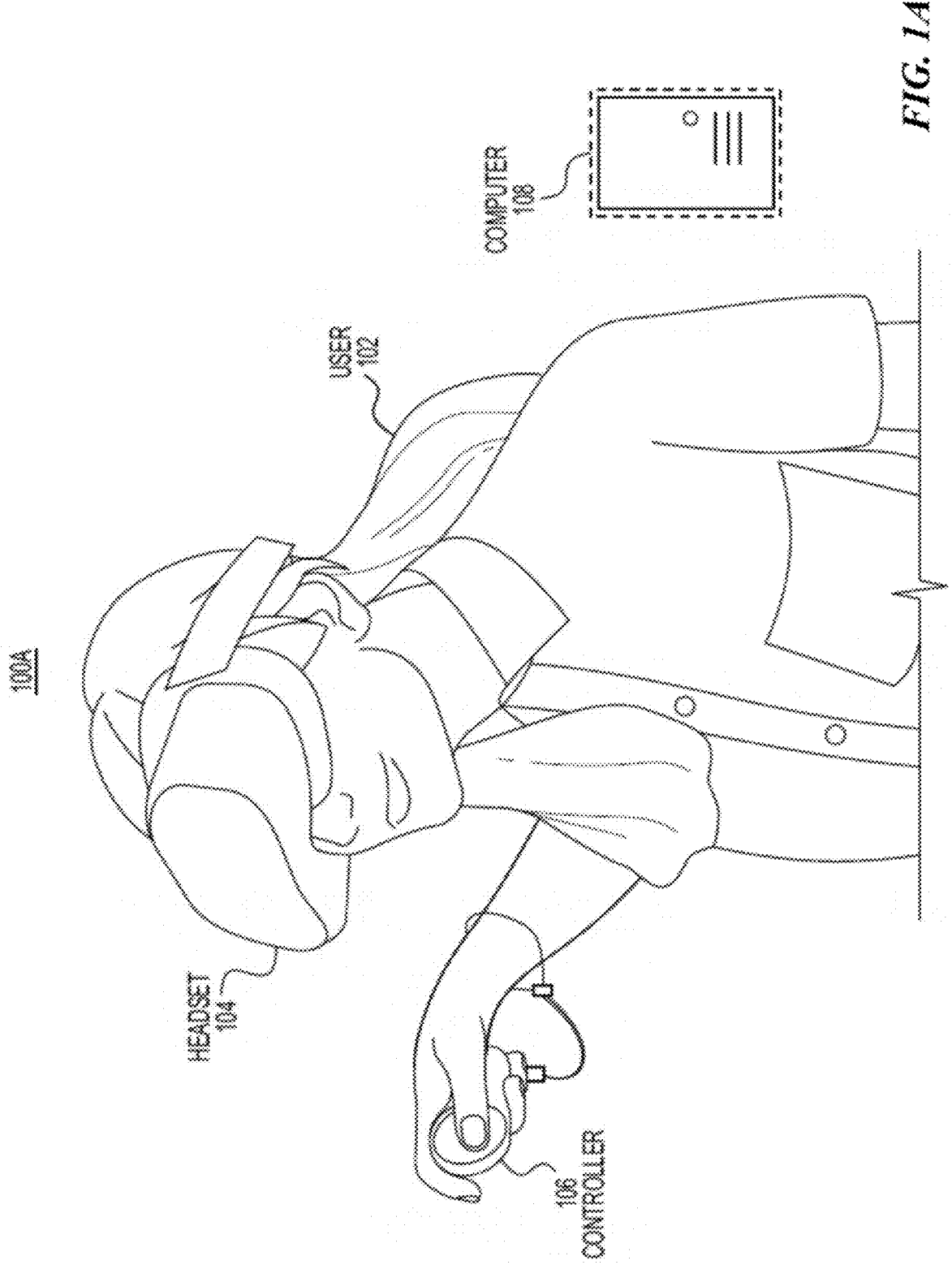
FIG. 1A illustrates an example artificial reality system.

Because artificial reality devices involve creating digital scenes or superposing computer-generated imagery onto a view of the real world, they provide a platform for designers and engineers to provide new forms of information, entertainment, or methods of collaboration. For example, artificial reality devices may allow users to communicate, seemingly in person, over long distances, or assist users by informing them of the environment around them in an unobtrusive manner. Because artificial reality experiences can often be customized, the user's experience with artificial reality may be deeply personal and highly engaging if presented with sufficient clarity and convenience.

One way that artificial reality experiences can augment human ability is with computer-generated images and/or text added to the real world, as in an augmented or mixed reality. From this simple principle, a variety of compelling use cases can be considered. Labels (e.g., texts, glyphs, etc.) or images describing a real-world object may be fixed in the world space (e.g., location-aware labels acting as street signs or providing a live map of a bike path), or images fixed to a real-world object as it moves through the space (e.g., a label added to a bus as it going on its route that provides detailed information about its route or capacity). Labels could also be used to help a user navigate through an unfamiliar city (e.g., creating a waypoint for the nearest restroom), or help find a friend in a crowd (e.g., a socially-aware waypoint fixed to another user). Other experiences worth considering may be based on interactions with real-world objects. For example, a user could "project" video onto a wall or screen that allows for the video to be played and visible to only herself or to others with access to a shared augmented space. As another example, a user could fix computer-generated text to a physical object to act as an augmented-reality book or magazine. Content could be displayed relative to the object (allowing a user to physical asset aside an augmented-reality) or could be displayed in a fixed relation to the user's (e.g., a tutorial video constantly playing in a corner of the view). Presented media could be customized to the user, so that the same content display space could content relevant to each person viewing the same physical space. As another example, a user could interact with computer-generated graphics by "touching" an icon, or "manipulating" the computer-generated images manually. These graphics could be shown to multiple users working on a project, enabling opportunities for team collaboration (e.g., multiple architects working on a three-dimensional digital prototype in a building together in real-time).

To facilitate use, the display that outputs the computer-generated graphics should be intuitive, constantly accessible, and unobtrusive. One approach for displaying high definition artificial reality graphics to a user is based on a head-mounted display. The user wears an apparatus, such as a visor, headset, or glasses, capable of displaying computer graphics display. In augmented or mixed reality experiences, the computer graphics can be seen alongside, or on top of, the physical world. However, rendering these computer graphics is computationally intensive. Therefore, in most cases rendering is performed by powerful computers communicatively attached (e.g., via a cable or wireless communication protocol, such as Bluetooth) to a head-mounted display. In such a configuration, the head-mounted display is limited by bulky cords, bandwidth and power limitations, heat restrictions, and other related constraints. Yet, the limits of these constraints are being pushed. Head-mounted displays that are comfortable and efficient enough for day-long wearing, yet powerful enough to display sophisticated graphics are currently being developed.

One technique used to reduce actual display size without impacting apparent display size is known as a scanning display. In a scanning display, multiple smaller images are combined to form a larger composite image. The scanning display uses source light, one or more scanning elements comprising reflectors, and an optics system to generate and output image light. The output image light may be output to the eye of the user. The source light may be provided by emitters, such as light-emitting diodes (LEDs). For example, the light source may be an array of 2560×1440 LEDs. The reflectors may be any suitable reflective surface attached to the scanning element. In particular embodiments, the scanning element may be a scanning mirror driven using one or more microelectromechanical systems (MEMS) components. The optics system may comprise lenses used to focus, redirect, and otherwise augment the light. The scanning element may cause the source light, treated by light guiding components, to be output to the eye of the user in a specific pattern corresponding to a generation pattern used by the emitters to optimize display draw rate. Because, for example, all emitters need not be active at once, and in addition to a variety of other factors, scanning displays may require less power to run, and may generate less heat, than traditional display comprised of the same emitters. They may have less weight as well, owing in part to the quality of the materials used in the scanning element and optics system. One consequence of using a scanning display is that in exchange for, e.g., power, weight, and heat efficiency, a scanning displays may not perfectly display images as presented to them, e.g., images intended for traditional displays. There may be non-uniform distortions such as geometric warping of images and distortion of colors and specifically brightness. As is explained further herein, these distortions can be corrected by post-processing graphics to-be displayed to counteract the distortion before they are passed to the display, creating the effect that there is no distortion. Although this disclosure describes displays in a particular manner, this disclosure contemplates any suitable displays.

Since its existence, artificial reality (e.g., AR, VR, MR) technology has been plagued with the problem of latency in rendering AR/VR/MR objects in response to sudden changes in a user's perspective of an AR/VR/MR scene. To create an immersive environment, users may need to be able to move their heads around when viewing a scene and the environment may need to respond immediately by adjusting the view presented to the user. Each head movement may slightly change the user's perspective of the scene. These head movements may be small but sporadic and difficult, if not impossible, to predict. A problem to be solved is that the head movements may occur quickly, requiring that the view of the scene be modified rapidly to account for changes in perspective that occur with the head movements. If this is not done rapidly enough, the resulting latency may cause a user to experience a sensory dissonance that can lead to virtual reality sickness or discomfort, or at the very least, a disruption to the immersive nature of the experience. Re-rendering a view in its entirety to account for these changes in perspective may be resource intensive, and it may only be possible to do so at a relatively low frame rate (e.g., 60 Hz, or once every $\frac{1}{60}$th of a second). As a result, it may not be feasible to modify the scene by re-rendering the entire scene to account for changes in perspective at a pace that is rapid enough (e.g., 200 Hz, once every $\frac{1}{200}$th of a second) to prevent the user from perceiving latency and to thereby avoid or sufficiently reduce sensory dissonance. One solution involves generating a two-dimensional (2D) image of an object's texture from a particular view of the object, which maps to a three-dimensional (3D) "surface" of the object within the scene. A surface, or texture image, is comprised of object primitives that represent a particular view of the object. A surface corresponds to one or more objects that are expected to move/translate, skew, scale, distort, or otherwise change in appearance together, as one unit, as a result of a change in perspective. Instead of re-rendering the entire view, a computing system may simply resample these surfaces from the changed perspective to approximate how a corresponding object would look from the changed perspective. This method may significantly reduce the rendering processing and thus ensure that the view is updated quickly enough to sufficiently reduce latency. Resampling surfaces, unlike re-rendering entire views, may be efficient enough that it can be used to modify views within the allotted time—e.g., in $\frac{1}{200}$th of a second—with the relatively limited processing power of a computing system of a HMD. It may not be feasible for a system that is physically separate from the HMD (e.g., a separate laptop or wearable device) to perform the resampling process because the time scales involved in the resampling process are extremely small. For example, if the resampling process were to be performed in a physically separate system, the HMD would have to transmit information about the current position and orientation of the HMD, wait for the separate system to render the new view, and then receive the new view from the separate system. The present embodiments, to further speed up the overall rendering process, specifically the resampling process, provide compression techniques for selectively encoding certain pixel blocks of an image based on the concept of Principal Component Analysis if the color values within the block are highly correlated to each other. The present embodiments also disclose the adaptive range packing technique that leverages the similarities between the pixel values within a pixel block to represent the pixel values with reduced number of binary bits.

FIG. 1A illustrates an example artificial reality system 100A. In particular embodiments, the artificial reality system 100A may comprise a headset 104, a controller 106, and a computing system 108. A user 102 may wear the headset 104 that may display visual artificial reality content to the user 102. The headset 104 may include an audio device that may provide audio artificial reality content to the user 102. The headset 104 may include one or more cameras which can capture images and videos of environments. The headset 104 may include an eye tracking system to determine the vergence distance of the user 102. The headset 104 may be referred as a head-mounted display (HMD). The controller 106 may comprise a trackpad and one or more buttons. The controller 106 may receive inputs from the user 102 and relay the inputs to the computing system 108. The controller 206 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 1B:
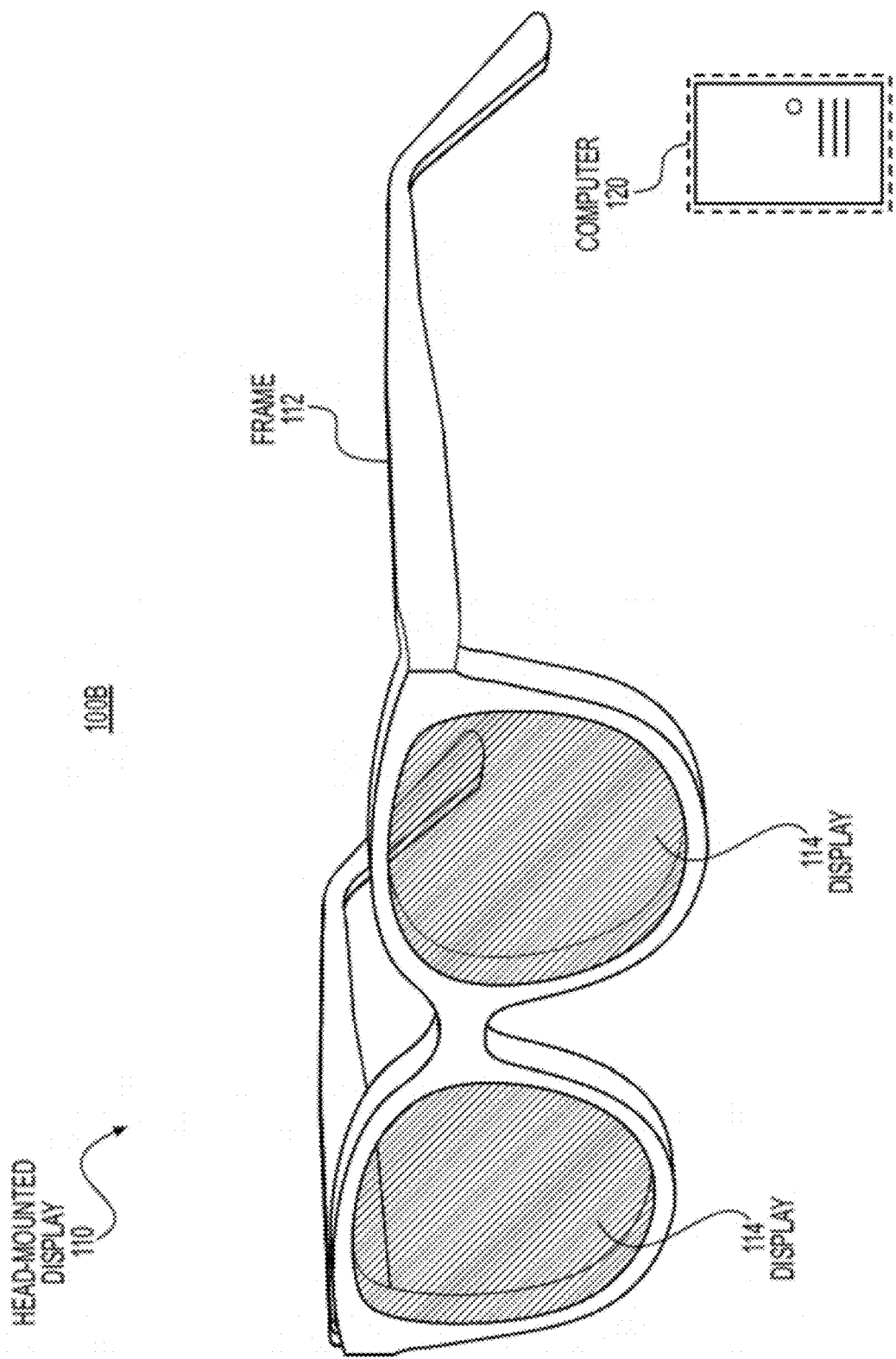
FIG. 1B illustrates an example augmented reality system.

FIG. 1B illustrates an example augmented reality system 100B. The augmented reality system 100B may include a head-mounted display (HMD) 110 (e.g., glasses) comprising a frame 112, one or more displays 114, and a computing system 120. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The augmented reality system 100B may further include a controller comprising a trackpad and one or more buttons. The controller may receive inputs from users and relay the inputs to the computing system 120. The controller may also provide haptic feedback to users. The computing system 120 may be connected to the HMD 110 and the controller through cables or wireless connections. The computing system 120 may control the HMD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users.

Figure 2:
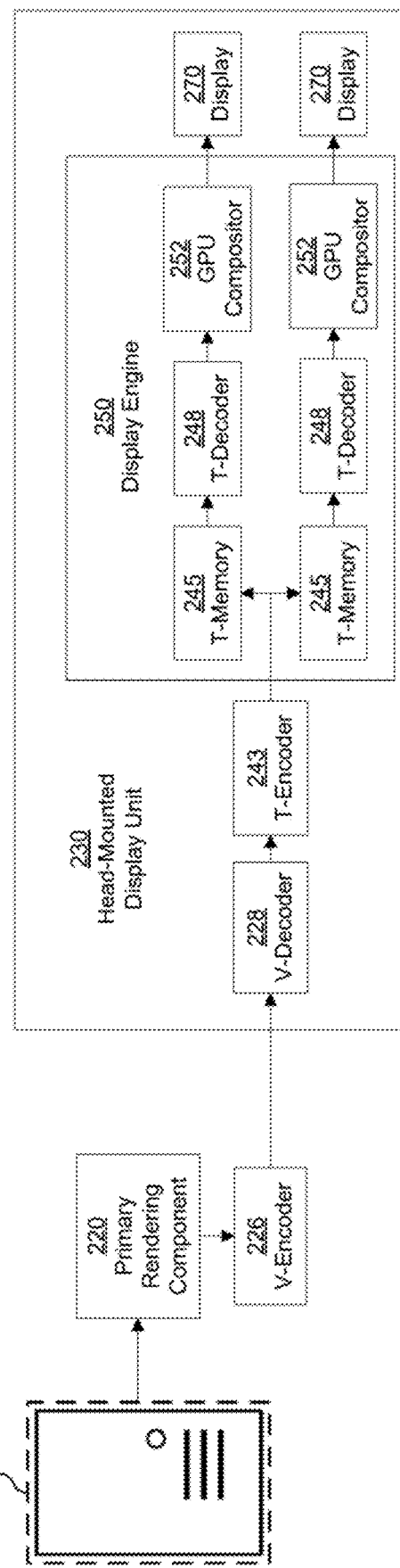
FIG. 2 illustrates an artificial reality graphics rendering and display system.

FIG. 2 illustrates an artificial reality graphics rendering and display system 200. In particular embodiments, the rendering and display system 200 may comprise a reserve rendering component 210. The reserve rendering component 210 may be a remote rendering component used to perform supplemental rendering, or pre-render elements that can be prepared with less requirement of interactivity. For example, the reserve rendering component 210 may be a rendering server provided through a cloud computing network or local area network that handles pre-rendering of streaming video or other non-interactive components. The user may provide her own reserve rendering component 210 or may gain access to a reserve rendering component 210 as part of a subscription plan. The reserve rendering component may communicate wirelessly or through one or more wired connections to a primary rendering component 220. The primary rendering component 220 may be a standalone device such as a laptop or desktop computer, video game console, or any other suitable local graphics rendering system, or a device easily-worn on the user's body, such as a cellphone, tablet, or any other suitable compact graphics rendering system. The reserve rendering component 210 and/or primary rendering component 220 may perform several processes of a typical rendering pipeline. In particular embodiments, the primary rendering component 220 may be capable of rendering interactive graphics based on three-dimensional ("3D") models defined by a plurality of polygons and rendering instructions sufficient to support a frame refresh rate up to or surpassing 60 frames per second.

The primary rendering component 220 may receive primary rendering data for a rendering request. The primary rendering data may include two- or three-dimensional models, textures, and instructions for rendering computer-generated images, and other suitable information. The primary rendering component 220 may perform initial steps to render aspects of the artificial reality scene based on the received primary rendering data. For example, the primary rendering component 220 may perform visibility computations using ray tracing, rasterization, or other suitable techniques to determine which polygons of which 3D models of virtual objects in a virtual scene are visible through which pixels of a display. Based on the visibility determinations, the primary rendering component 220 may perform shading computations to determine the appropriate color for each pixel. In particular embodiments, the primary rendering component 220 may receive compressed or decompressed streaming video data from the reserve rendering component 210 at a rate of 30 frames per second, or similar. The primary rendering component 220 may combine data received from the reserve rendering component 210 with data generated by the initial rendering steps.

In particular embodiments, one or more specialized object primitives, e.g., "surfaces," for use by a display engine 250 may be generated. As an example, the primary rendering component 220 may generate surfaces by first rendering 2D images from 3D models, as in a typical rendering pipeline. The primary rendering component 220 may then generate surfaces from the 2D images using an additional post-processing method. As another example, the primary rendering component 220 may directly output surfaces from 3D models, eliminating extra steps directed only to rendering 2D images. As another example, the primary rendering component 220 may output 2D images from 3D models to a display engine 250. The display engine 250 may generate surfaces using an additional post-processing method based on the 2D images. In particular embodiments, the output of the primary rendering component 220 may be encoded by the v-encoder 226, then transmitted to the v-decoder of the head-mounted display unit 230.

Surfaces may comprise information useful for rendering one or more virtual objects of an artificial reality scene. The information may include location and/or position data for the surface in the scene, specified in the coordinate system of the view space relative to the virtual camera/viewer (alternatively, location of the surface may also be specified in any other suitable coordinate system, such as the world space coordinate system). The surface may further include texture data, represented by one or more texel arrays. Thus, in particular embodiments, a "surface" may be considered as a rectangular texture with a transformation matrix to specify its location within a scene. Each texel in the texel array may have color information and a 2D coordinate within the texel array (e.g., specified in (u, v) coordinates). In particular embodiments, the color information of each texel may indicate the intensity of several color channels (e.g., red, green, and blue) and alpha information that indicates the texel's transparency level (e.g., completely transparent, completely opaque, or somewhere in between). In other embodiments, the color information of a texel may indicate the intensity of red, green, and blue without separately specifying the transparency level. In this case, the value for each color may be pre-multiplied by the texel's associated transparency level (e.g., if the texel is fully transparent with an alpha level of 0, then the red, green and blue values for that texel would all be zeroed-out by being multiplied by the 0 alpha level).

The texture data of a surface may be generated based on the result of a standard graphic rendering pipeline, embodying techniques to optimally determine the colors that should be displayed by the pixels of a display or image based on the perspective of a viewer in a three-dimensional scene. In particular embodiments, the display engine 250 may limit the number of surfaces (e.g., a maximum of 16 surfaces or any other suitable number of surfaces) that it will process to ensure sufficient simplicity in the scene so that performance demands can be met (e.g., to output frames at 200-300 hertz). Therefore, certain virtual objects in the artificial reality scene may be grouped according to any suitable rule. Each surface may be a representation of one or more objects within the scene that are expected to move/translate, skew, scale, distort, or otherwise change in appearance together, as one unit, as a result of a change in a user's perspective of the scene (e.g., resulting from a HMD on a user's head moving to a different position and/or orientation). As an example and not by way of limitation, an avatar of a person and a hat worn by the avatar may correspond to one surface if it is determined that person and the hat would move/translate, skew, scale, distort, or otherwise change in appearance together, as one unit. In particular embodiments, a surface may correspond to sets of points (e.g., points making up an object) that are expected to move/translate, skew, scale, distort, or otherwise change in appearance as a single unit when a user's perspective of a scene changes.

The primary rendering component 220 may communicate with a head-mounted display unit 230 through one or more wired or wireless connections. In particular embodiments, a user may be able to select how the primary rendering component 220 and head-mounted display unit 230 communicate based on the user's needs. The head-mounted display unit 230 may be configured to receive data, such as surfaces and other rendering instructions, from the primary rendering component 220. The head-mounted display unit 230 may prepare to display an artificial reality scene to a user based on the received data. In particular embodiments, the head-mounted display unit 230 may comprise a display engine 250 and one or more displays 270. In particular embodiments, the displays 270 may be scanning displays, including all necessary emitters, scanning elements, and optical systems. The head-mounted display unit 230 may further comprise additional components not shown that facilitate the rendering and display of the artificial scene. These may include additional image processing components, eye-tracking components, heat detection components, any other suitable components, or any combination thereof. Although this disclosure describes rendering components in a particular manner, this disclosure contemplates any suitable rendering components.

In particular embodiments, the display engine 250 and displays 270 of the head-mounted display may be configured specifically to enable a fast frame display or refresh rate. In typical interactive graphics rendering systems, a target frame rate may be at or around sixty frames per second. While this is sufficient for the images to appear as crisp, smooth moving video in traditional systems, it may not be sufficient for artificial reality. Because of the immersive nature of the artificial reality experience, and further exacerbated by the head-mounted nature of the display and its proximity to the user's eyes, artificial reality rendering and display system 200 may target much higher frame display rates, e.g., upwards of two to three hundred frames per second, in order to display images responsive to changes in the user's viewpoint and/or movement (e.g., head and/or eye movement). If this is not done quickly enough, the resulting latency may cause a user to experience a sensory dissonance that can lead to virtual reality sickness or discomfort. In particular embodiments, the artificial reality rendering and display system 200 may be capable of tracking and reacting to the user's eye movements. To provide smooth video when reacting to eye movement, the system 200 may target even higher display rates during particularly intense periods, e.g., bursts of up to eight hundred frames per second.

The entire system may be configured with these fast display rate benchmarks in mind. A target frame rate of 200 frames per second is roughly equivalent to one frame every 5 milliseconds. Significant time is lost by transmitting movement data to, and updating rendering data from, a powerful graphics processor over wireless, or even wired connections. Therefore, at least some amount of graphics preparation must occur in a head-mounted unit, reducing the time lost in transmission. However, a head-mounted display unit 230 has weight, power, and space constraints that must be adhered to for the comfort of the user. These weight, power, and space constraints restrict the components and computational power available for a head-mounted display unit 230. In fact, using conventional approaches, components available for a head-mounted display unit 230 suitable for long-term wear are incapable of rendering artificial reality scenes from 3D models comprising polygons with suitable lighting at 60 frames per second, let alone the 200 or more necessary for an immersive experience.

One solution to this problem involves a powerful primary rendering component 220 performing the complex graphics generation work needed to generate surfaces at around 60 frames per second. A display engine 250 of a head-mounted display unit 230 may comprise hardware components powerful enough to adjust or re-sampling what the primary rendering component 220 produces based on a user's movements between updates from the primary rendering component 220. The display engine 250 may rapidly respond to perspective changes created by a user's movement to reprocess the output of the primary rendering component 220, warping or otherwise adjusting the output of the primary rendering component 220 until the primary rendering component 220 has prepared another frame for display. For example, the primary rendering component 220, as described, may render 2D images of virtual objects in a 3D scene at typical rates, e.g., around sixty frames per second. The 2D images may be used to generate surfaces. Each surface may comprise location information that indicates the surface's 3D location relative to the viewer and texture information for the virtual objects they represent, including the results of complex lighting effects, occlusion determination, and implementation of other rendering techniques performed by the primary rendering component 220. The primary rendering component 220 may send the surfaces to the display engine 250. The display engine 250 may then use updated information about, e.g., the position and/or orientation of the user to re-sample the surfaces from the current user perspective and warp the surface to accommodate characteristics of the display. The simplified geometries of the scene (due to the use of surfaces), along with other optimization techniques, enable the display engine 250 to perform the task of refining and rendering the artificial scene at the desired target rates (e.g., at more than 200 frames per second). Thus, while the primary rendering component 220 prepares surfaces that are precise to a user's movements once every ⅙₀th of a second, the display engine 250 may re-sample the output to refine the position of graphic every ½₀₀th of a second, filling in the gaps created by the frame rate of the primary rendering component 220. This may create a high quality artificial reality experience for the user with smooth and seamless movement of computer generated graphics, while still providing comfortable equipment.

Another solution to this problem involves a compression technique that jointly encodes color components of the surfaces or 2D images (e.g., red, blue, green color channels), which is referenced herein as the joint-color mode. Typically, pixels are associated with three dimensions, or channels, of colors (e.g., red, blue, green color channels). As discussed with additional details below, the joint-color mode encodes the three channels of colors together if there is strong RGB color correspondences between pixels in a pixel block. If not, the pixels color values are encoded separately using standard encoding techniques. As illustrated in FIG. 2, t-encoder 243 of the HMD 230 encodes the surfaces based on either joint-color mode or standard mode depending on the color correspondences. The encoded data is stored in the t-memory 245 residing within the display engine 250 of the HMD 230. When the color information for a particular surface is needed, the GPU compositor 252 accesses the decoded pixel values from t-decoder 248 which access the compressed data from t-memory 245.

Figure 3:
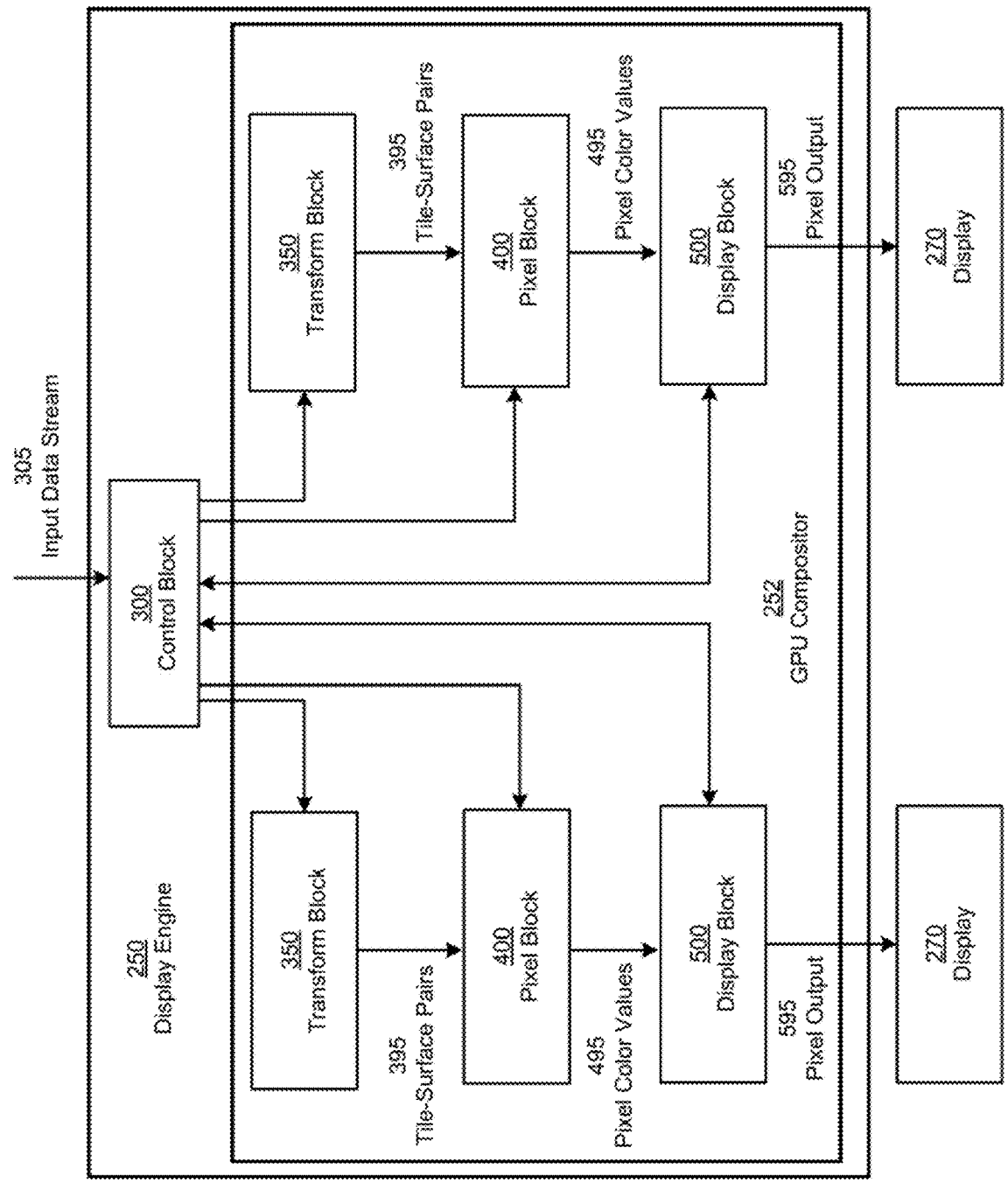
FIG. 3 illustrates a system diagram for a display engine.

FIG. 3 illustrates a system diagram for a display engine 250. The display engine 250 may comprise four types of top level blocks. As shown in FIG. 2, these blocks may include a control block 300, transform blocks 350, pixel blocks 400, and display blocks 500. One or more of the components of the display engine 250 may be configured to communicate via one or more high-speed bus, shared memory, or any other suitable method. As shown in FIG. 2, the control block 300 of display engine 250 may be configured to communicate with the transform blocks 350, pixel blocks 400, and display blocks 500, of two mirrored pipelines. In particular embodiments, each pipeline of display engine 250 may be dedicated to preparing images for a separate display 270 to display. Each display 270 may be configured to display images to a user's left and right eye respectively. As explained in further detail herein, this communication may include data as well as control signals, interrupts and other instructions. The two pipelines may be capable of operating independently of the other.

In particular embodiments, the control block 300 may receive an input data stream 305 from the primary rendering component 220 and initialize a pipeline in the display engine 250 to finalize the rendering for display. In particular embodiments, the input data stream 305 may comprise data and control packets from the primary rendering component 220. The data and control packets may include information such as one or more surfaces comprising texture data and position data and additional rendering instructions. The control block 300 may distribute data as needed to one or more other blocks of the GPU Compositor 252. The control block 300 may initiate pipeline processing for one or more frames to be displayed. In particular embodiments, head-mounted display unit 230 may comprise multiple display engines 150 and each may comprise its own control block 300.

In particular embodiments, transform blocks 350 may determine initial visibility information for surfaces to be displayed in the artificial reality scene. In general, transform blocks 350 may cast rays from pixel locations on the display and produce filter commands (e.g., filtering based on bilinear or other types of interpolation techniques) to send to the pixel blocks 400. Transform blocks 300 may perform raycasting from the current viewpoint of the user (e.g., determined using inertial measurement units, eye trackers, and/or any suitable tracking/localization algorithms, such as simultaneous localization and mapping (SLAM)) into the artificial scene where surfaces are positioned and may produce results to send to the pixel block 400.

In general, transform blocks 350 may each comprise a four-stage pipeline, in accordance with particular embodiments. The stages of a transform block 350 may proceeds as follows. A ray caster may issue ray bundles corresponding to arrays of one or more aligned pixels, referred to as tiles (e.g., each tile may include 16×16 aligned pixels). The ray bundles may be warped, before entering the artificial reality scene, according to one or more distortion meshes. The distortion meshes may be configured to correct geometric distortion effects stemming from, at least, the displays 270 of the head-mounted display 230. Transform blocks 300 may determine whether each ray bundle intersects with surfaces in the scene by comparing a bounding box of each tile to bounding boxes for each surface. If a ray bundle does not intersect with a surface, it may be discarded. Tile-surface intersections are detected, and corresponding tile-surface pairs 395 are passed to the pixel blocks 400.

In general, pixel blocks 400 determine color values from the tile-surface pairs 395 to produce pixel color values, in accordance with particular embodiments. The color values for each pixel are sampled from the texture data of surfaces received and stored by the control block 300 (e.g., as part of input data stream 305). Pixel blocks 400 receive tile-surface pairs 395 from transform blocks 350 and schedule bilinear filtering. For each tile-surface pair 395, pixel blocks 400 may sample color information for the pixels within the tile using color values corresponding to where the projected tile intersects the surface. In particular embodiments, pixel blocks 400 may process the red, green, and blue color components separately for each pixel. Pixel blocks 400 may then output pixel color values 495 to the display blocks 500.

In general, display blocks 500 may receive pixel color values 495 from pixel blocks 400, convert the format of the data to be more suitable for the scanline output of the display, apply one or more brightness corrections to the pixel color values 495, and prepare the pixel color values 495 for output to the displays 270. Display blocks 500 may convert tile-order pixel color values 495 generated by pixel blocks 400 into scanline- or row-order data, which may be required by the displays 270. The brightness corrections may include any required brightness correction, gamma mapping, and dithering. Display blocks 500 may provide pixel output 595, such as the corrected pixel color values, directly to the displays 270 or may provide the pixel output 595 to a block external to the display engine 250 in a variety of formats. For example, the head-mounted display unit 230 may comprise additional hardware or software to further customize back-end color processing, to support a wider interface to the display, or to optimize display speed or fidelity.

In particular embodiments, the control block 300 may receive an input data stream 305 from the primary rendering component 220 and initialize a pipeline in the display engine 250 to re-sample or correct artificial reality surfaces based on the user's current viewpoint. In particular embodiments, the control block 300 may receive control packets from the primary rendering component 220. The control packets may include one or more surfaces with texture data and position data (e.g., as defined by transformation matrices) to be rendered in the artificial reality scene.

Particular embodiments disclosed herein are directed to image compression techniques that leverage strong RGB color correspondences between pixels in a pixel block. Conventional compression techniques are typically asynchronous, thus are too slow to allow real-time encoding and decoding. To allow images to be encoded/decoded faster, embodiments of this disclosure provide a method of selectively encoding certain pixel blocks of an image based on the concept of Principal Component Analysis if the color values within the block are highly correlated to each other. The high-level idea is that, if pixel color values within a block are highly correlated to each other, the color values for the entire block can be encoded into a simplified representation that captures most of the color information. This technique, referred to as the joint-color mode, can be selectively applied to certain pixel blocks in an image if the block is suitable for the joint-color mode (e.g., high correlation of pixel color values), while other blocks of the image are encoded using the standard encoding method (normal mode).

Principal Component Analysis (PCA) is a method used to reduce the dimensionality of large data sets, by transforming a large set of variables into a smaller one that still contains most of the information in the large set. This method involves transforming multi-dimensional dataset into pairs of eigenvector and eigenvalue, each pair representing one dimension of the data set. An eigenvector, also referred to as the principal component, is a characteristic vector that represents a new dimension or a new axes of the data set, or said differently, a line or a direction representing values of the data set that are associated with the highest variance (most information). An eigenvalue is a scaling coefficient attached to the corresponding eigenvector and represents the amount of variance carried in each principal component. When transforming a data set based on eigenvectors and eigenvalues, the number of dimensions represented by the eigenvectors and eigenvalues match the number of dimensions of the data set. Thus, for example, in the context of RGB colors, representing the dataset based on PCA would produce three pairs of eigenvector and eigenvalue, since there are three channels, or dimensions, of colors (e.g., red, blue, green channels). In reference to eigenvectors and eigenvalues, determining whether to encode a pixel block based on the joint-color mode involves determining that the RGB color values of the pixel block have sufficiently strong correspondences such that one pair of eigenvector and eigenvalue can represent most of the color information of the pixel block. Thus, encoding the pixel block based on the joint-color mode means that the RGB color values of the pixel block are encoded as a single-dimensional data set represented by the line corresponding to a dominant eigenvector.

The disclosed embodiments provide techniques for jointly encoding RGB color values of certain pixel blocks if there are strong color correspondences between the RGB colors of a pixel block. In particular embodiments, determining whether to encode the pixel block using the joint-color mode involves calculating the largest eigenvalue and eigenvector for the pixel color values within a pixel block and determining whether the largest eigenvalue is significantly bigger than the other eigenvalues (indicating dominance over the other eigenvalues). In one method, the power iteration technique may be used to determine the largest eigenvalue and eigenvector for the pixel color values in a pixel block. The power iteration technique involves iteratively performing the steps of approximating an arbitrary starting vector $v_i$, multiplying the vector $v_i$ by matrix A (e.g., 3×3 co-variance matrix for RGB color values of the pixel), then normalizing the resulting vector $v_j$ based on the largest entry n of the resulting vector. These steps may be performed iteratively for a predetermined number of iterations (e.g., four iterations), then the resulting vector $v_j$ may be checked to see if it has converged into the eigenvector corresponding to the largest eigenvalue, which may be indicated by the largest entry n corresponding to the resulting vector $v_j$ (e.g., the eigenvector). If it has, then the dominance of the largest eigenvalue may be determined by comparing it to the other eigenvalues (e.g., based on the ratio between the largest eigenvalue and the sum of all eigenvalues). If the largest eigenvalue is sufficiently dominant (e.g., if the ratio is higher than a threshold ratio), the color channels of the pixel block may be jointly encoded using the joint-color mode; otherwise, the color channels of the pixel block may be encoded separately. For example, referring to the coordinate system 410 in FIG. 4, the color values of a pixel block are illustrated as having strong color correspondences such that a line drawn through the pixels could be used to represent the distribution of the pixel values in the dataset. This line could be represented by an eigenvector, and the eigenvalue corresponding to the eigenvector may be determined as being dominant in part due to the eigenvalue having a high ratio value of, for example, 0.9612, when compared to the sum of all eigenvalues. As a counter-example, referring to the coordinate system 433, the color values of a different pixel block are illustrated as having weak color correspondences such that a line drawn through the pixels would not be able to accurately represent the distribution of the pixel values in the dataset. Thus, an eigenvalue corresponding to the line may not be determined as being dominant in part due to the eigenvalue having a ratio value that is, when compared to the other eigenvectors, lower than a predetermined threshold (e.g., 0.8412). In particular embodiments, the threshold ratio value for the eigenvalue may be predetermined based on the type of data set (e.g., 0.96 threshold ratio for type of data corresponding to RGB values). In particular embodiments, determining the dominance of the eigenvalue may involve using other techniques such as: inverse iteration, Rayleigh quotient iteration, preconditioned inverse iteration, etc.

In particular embodiments, if a pixel block is to be encoded using the joint-color mode, the encoding process may involve dividing the line corresponding to the dominant eigenvector (i.e., principal component) into bins based on the minimum and maximum color values of the pixel block and a particular number of bits assigned to the encoding process. Then, each pixel in the pixel block (e.g., in the three-dimensional RGB coordinate space) may be projected onto the line and encoded based on the bin that the projection falls into. Each bin is associated with a single quantized value falling on the single-dimensional line corresponding to the dominant eigenvector. For example, referring to the coordinate system 510 in FIG. 5, the color values of a pixel block are illustrated as having strong color correspondences such that a line drawn through the pixels (e.g., dominant eigenvector) sufficiently represents the distribution of the pixel color values in the dataset. In the embodiment illustrated in FIG. 5, the encoding process is assigned 3 binary bits to represent the bins, thus, as illustrated in the coordinate system 520, the line is divided into 8 bins since 3 bits are able to represent 8 different values. The first bin is illustrated as corresponding to the minimum value of the pixel values in the pixel block (e.g., minimum pixel value [32, 22, 12]), and the last bin is illustrated as corresponding to the maximum value of the pixel values in the pixel block (e.g., maximum pixel value [66, 53, 42]). In particular embodiments, the number of bits assigned to the encoding process may be determined based on the range of the pixel values corresponding to a particular color channel. For example, if the range of red pixel values in the block is 20 (e.g., minimum pixel value of 100; maximum pixel value of 120), the pixels may be encoded using 5 bits since 5 bits are able to represent 32 different values. In some embodiments, the number of bits assigned to the encoding process may be determined based on the average range of the pixel values corresponding to two or three color channels. In other embodiments, the number of bits assigned to the encoding process may be determined based on a target compression ratio for the pixel block (e.g., 3 bits).

In particular embodiments, the decoding process involves identifying the bin that the pixel was encoded based upon and the associated quantized value of the bin, which corresponds to the one-dimensional coordinate space of the dominant eigenvector, then determining the three-dimensional point in the RGB coordinate space that corresponds to the quantized value of the bin. In some embodiments, the RGB color values corresponding to each bin may be indexed in a look-up table, allowing the RGB color values to be determined based on thereof.

Figure 6A:
FIGS. 6A-6B illustrate an image being selectively encoded.
Figure 6B:
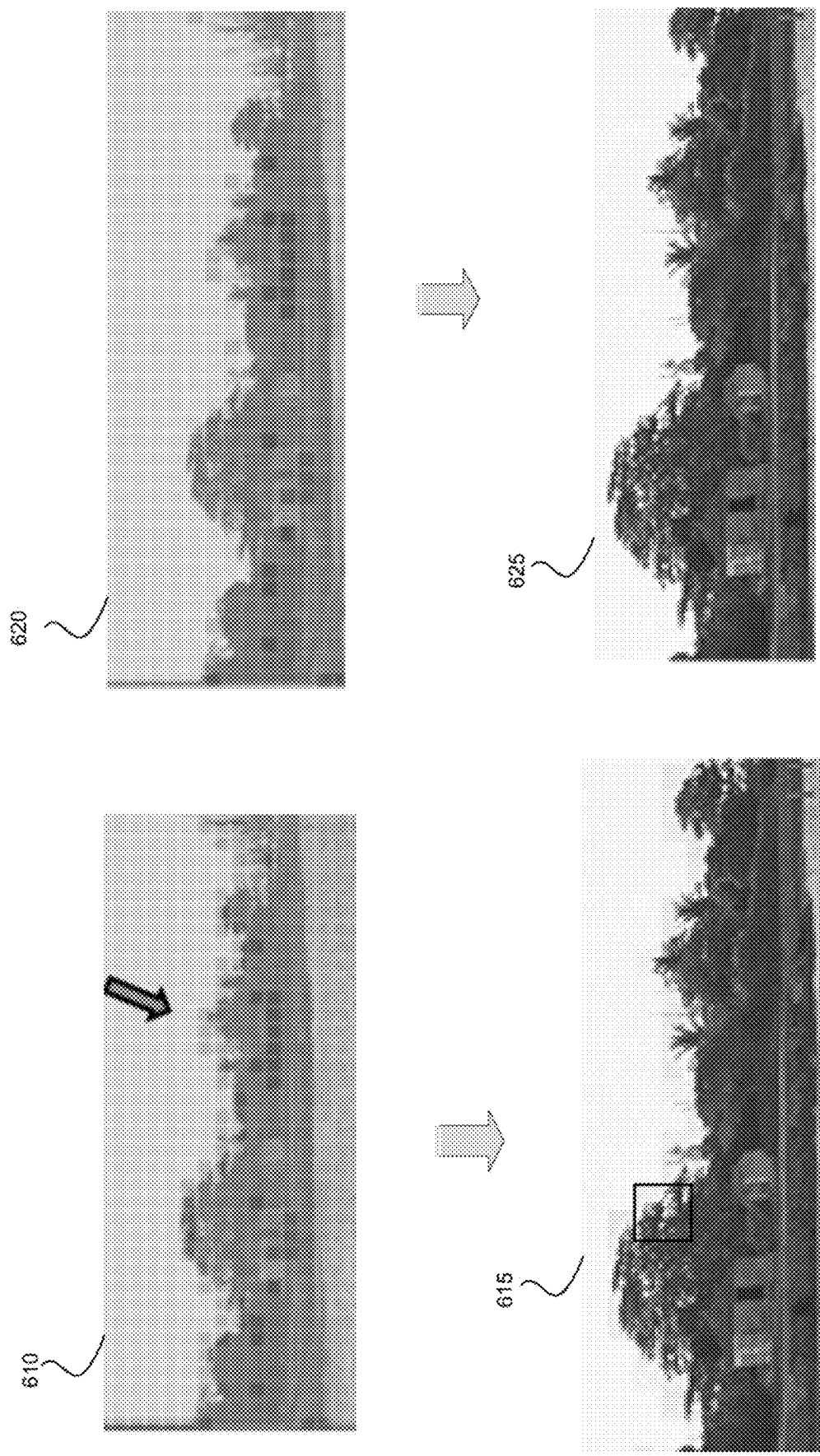

FIG. 6A illustrates an example image comprising a plurality of pixel blocks that are selectively encoded using the joint-color mode. The lighter pixel blocks correspond to blocks with sufficiently high RGB color correspondences, thus may be encoded using the joint-color mode where the color values of the pixels are jointly encoded based on PCA. The darker pixel blocks correspond to blocks without sufficiently high RGB color correspondence, thus may be encoded using a standard encoding mode where the color values for each of the color channels are encoded separately. As discussed above, pixel blocks may be encoded using the joint-color mode if there are strong correspondences between the RGB color values in the pixel block. However, in some embodiment, pixel blocks may not be encoded with the joint-color mode even if the color values of the block are highly correlated to each other, because the joint-color mode may not be able to accurately represent the color information of the block, thereby producing undesirable artifacts when the block is decoded. For example, FIG. 6B illustrates an image 610 comprising darker pixel blocks corresponding to the edges of the trees. Those darker pixels were determined as having sufficiently high RGB color correspondences, thus were encoded using the joint-color mode. However, as it can be seen in the decoded image 615, undesirable artifacts can be seen by the outer-edges of the trees. Such undesirable artifacts may be produced if pixel blocks comprising overexposed pixels or high-contrast pixels are encoded using the joint-color mode. Examples of high-contrast pixels are shown in the image 615 (e.g., the edges of the trees indicated by the illustrated box). Thus, in particular embodiments, even if the color values of the block are highly correlated to each other, certain pixel blocks may be encoded using the standard encoding mode, for example, if the color range of the pixels is greater than a threshold value (to detect high-contrast edges) or if there are a group of over-exposed pixels (e.g., a group of pixels with value of pixel value 255). A demonstration of this technique is illustrated in images 620 and 625 where the edges of the trees do not display any undesirable artifacts.

Figure 7:
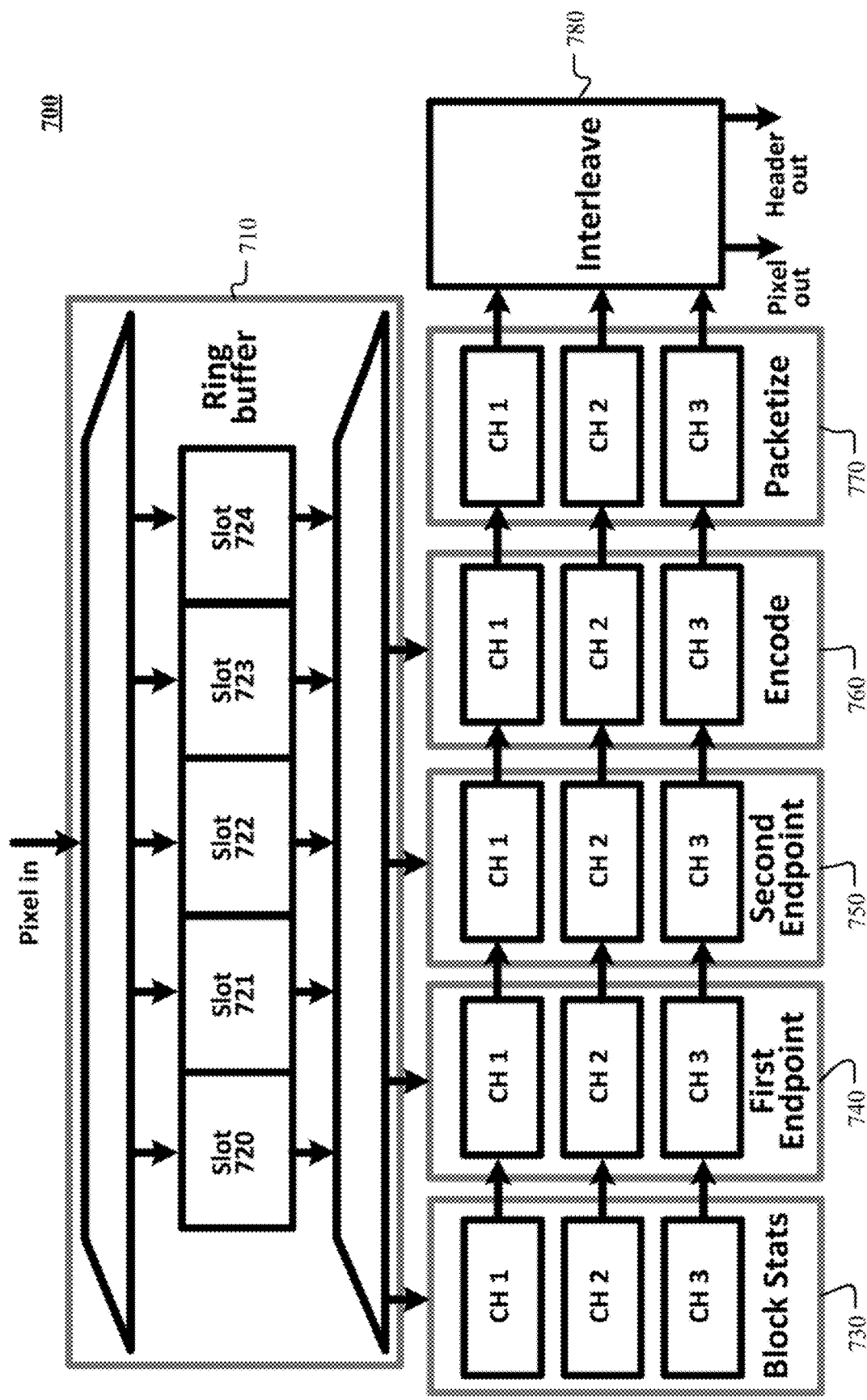
FIG. 7 illustrates an example encoder system that leverages a ring buffer.

FIG. 7 illustrates an embodiment of a modular architecture of an encoder system 700 that leverages a ring buffer 720 to temporarily store multiple pixel blocks, or otherwise referred herein as pixel regions, such that the pixel blocks can be accessed by various processing units in parallel. Each pixel block may be accessed sequentially by the processing units from one of the slots of the ring buffer 720 until the pixel block is fully processed and encoded. In other words, data corresponding to the pixel blocks are not moved/transmitted during the encoding process. This allows substantial reduction in computational costs by minimizing the data movement of the pixel blocks.

In an embodiment, the encoder system 700 includes a 4-stage pipeline made up of various processing units. The processing units of the 4-stage pipeline include: a "block stats" unit 730 that determines statistical measurements of a pixel block (e.g., variance, channel priority) and the bit allocation of each channel of the pixel values; "first endpoint" and "second endpoint" units 740 and 750 that determine the optimal endpoints of the pixel encoding quantization levels (e.g., minimum and maximum values); and an "encode" unit 760 that encodes pixels in the pixel block based in part on the determined optimal endpoints. The architecture of the encoder system 700 allows pixel data to be stored and accessed from each of the slots of the ring buffer 710 during the encoding process, meaning that there is no movement of pixel data between the processing units 730, 740, 750, and 760. This provides considerable reduction in computational costs by minimizing the overall data movement during the encoding process. Instead, data corresponding to each pixel block is temporarily stored in one of the slots of the ring buffer 710 and made available to the processing units 730, 740, 750, and 760 until the pixel block is encoded, after which time the pixel data in the slot is removed or replaced by data corresponding to another pixel block. For example, pixel data stored in slot 720 could be accessed and processed, sequentially, by the block stats unit 730, the first endpoint unit 720, the second endpoint unit 730, then the encode unit 760. In some embodiments, the pixel data stored in slots may be accessed and processed selectively in a non-sequential manner. Once the encode unit 760 completes encoding the pixel data, the pixel data may then be deleted or removed from the slot 720, allowing data corresponding to anther pixel block to be stored in the slot 720.

At any given time, each of the processing units 730, 740, 750, and 760 could be processing data in different slots, allowing parallel processing of four different pixel blocks at once. While pixel data stored in the slots are not transmitted between the processing units 730, 740, 750, and 760, computations, calculations, and/or determinations made by the processing units may be shared amongst the processing units. For example, once the block stats unit 730 processes a pixel block and determines statistical measurements and bit allocations of the pixel block, these determinations may be provided to the first endpoint unit 740 and the second endpoint 750. The first and second endpoint units 740 and 750 may then determine the optimal endpoints of the pixel encoding quantization levels based in part on the information received from the block stats unit 730. Similarly, the encode unit 760 may process the pixel data based in part on the determinations made by the previous processing units. After the pixel block is encoded by the encode unit 760, the encoded pixel data is transmitted to a "packetize" unit 770 then to an "interleave" unit 780. The packetize unit 770 assembles the encoded pixel data and corresponding headers into packets, and the interleave unit 780 arranges the packets into a bitstream. The operations of the packetize unit 770 and the interleave unit 780 contrasts those involving the previous processing units (e.g., the processing units 730, 740, 750, and 760) in that pixel data may actually be transmitted between the encode unit 760, packetize unit 770 and interleave unit 780. The disclosure of this Application, when referencing the 4-stage pipeline, may include the operations of the packetize unit 770 and the interleave unit 780 within the 4-stage pipeline, as part of the final operations of the encoder system 700, for example, in combination with the operations of the encode unit 760.

The modular architecture of the encoder system 700 allows it to be flexible and easily configurable. In some embodiments, the 4-stage pipeline may be reduced to 3, 2, or less stages by removing or combining some of the processing units from the pipeline, for example, by combining the first and second endpoint units 740 and 750. Alternatively, the 4-stage pipeline may be increased to 5, 6, or more stages by including additional stages to the pipeline. In an embodiment, the number of total slots in the ring buffer may be configured to have one additional slot than the number of stages in the pipeline. For example, if the pipeline is modified to include 6 stages, the number of slot may be increased to 7 slot, allowing data stored in 6 of the slots to be accessed simultaneously and in parallel, while the last slot receives/stores, or prepares to receive/store, data corresponding to another pixel block.

The encoder system 700 is capable of processing various types of pixel data such as those corresponding to image colors, depth, and motion or optical flow. Depending on the type of data associated with the image, each pixel may have multiple components, or otherwise referred herein as channels. For example, if the type of pixel data corresponds to color values, each pixel may be associated the red, blue, and green components of RGB colors, Cb and Cr components for chrominance, or Y component for luminance. If the type of data corresponds to motion, each pixel may be associated with components corresponding to motion vector/field or optical flow vector/field. If the type of data corresponds to depth, each pixel may be associated with a depth component (e.g., z value). In the embodiment illustrated in FIG. 7, each of the processing units 730, 740, 750, 760, and 770 is configured with three sub-units (e.g., CH 1, CH 2, CH3), each sub-unit configured to process one channel of pixel data. This allows the encoder system 700 of the embodiment to process, for example, the three color channels of the RGB color values. In other embodiments, each of the processing units 730, 740, 750, 760, and 770 may be configured with the same or a fewer number of sub-units appropriate for processing the various components or channels of the pixel data. In some embodiments, the encoder system 700 may further process an additional channel of pixel values, i.e., an alpha component directed to the opaqueness of the pixels, separately from the processor units 730, 740, 750, 760, and 770. In such embodiments, the alpha values may first be transcoded into a format matching the encoded and packetized pixel values, then interleaved into a bitstream by the interleave unit 780. References to pixel channels within the disclosure of this Application may be used interchangeably with references to pixel components.

In an embodiment, the ring buffer 710 includes a slot pointer that specifies which slot is available to receive incoming pixel data of a pixel block. The incoming pixel data may be routed by a multiplexer to the appropriate slot. In an embodiment, each of the slots of the ring buffer 710 includes a processor pointer that specifies which processor unit data stored on the slot is being made available to. The pixel data stored in each of the slots may be routed to the appropriate processing unit by a multiplexer.

Figure 8:
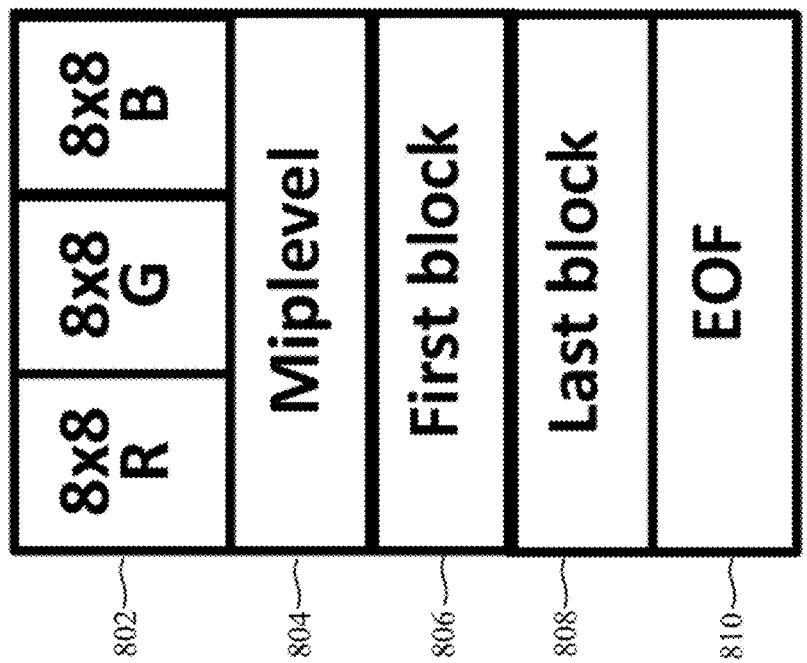
FIG. 8 illustrates an example slot of a ring buffer.

FIG. 8 illustrates an example configuration of a slot of a ring buffer. In an embodiment, each slot may be configured to store one or more channels of pixel data and additional metadata. For example, FIG. 8 illustrates a slot configured to store data corresponding to a pixel block comprising three channels of RGB color values 802 and additional metadata associated with the pixel block, including miplevel data 804 specifying where the pixel block falls under within a pre-calculated, lower-resolution representation of an image, first block data 806 indicating whether the pixel block is the first pixel block of a row of pixel blocks, last block data 808 indicating whether the pixel block is the last pixel block of the row of pixel blocks, end-of-file (EOF) data 810 indicating whether the pixel block is the last one of the image. Such metadata may be utilized at the end of the overall encoding process, for example, by the interleave unit 780 to arrange packets into a bitstream.

Figure 9A:
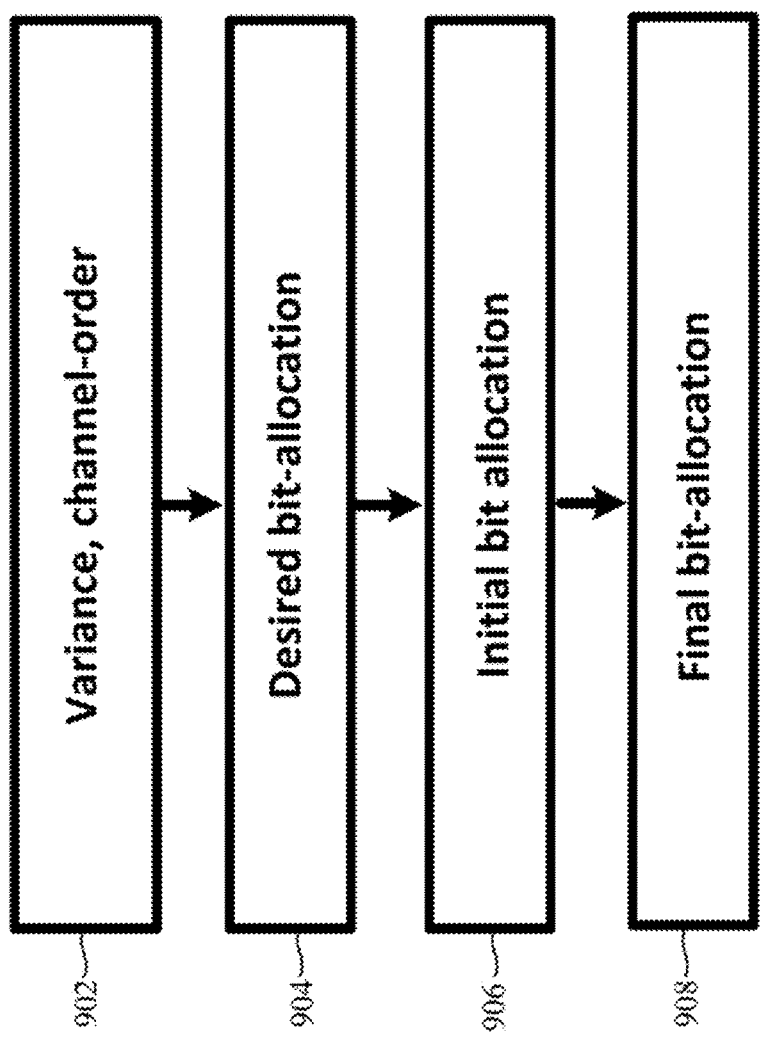

FIGS. 9A-9B illustrate a diagram of the operations of the block stats unit 730. In an embodiment, the block stats unit 730 selectively accesses data corresponding to a pixel block stored in one of the slots of the ring buffer 710. The block stats unit 730 processes and analyzes the pixel block to determine statistical measurements and the final bit allocation for each channel of the pixel values. The encoder system 700 of this disclosure presents techniques for encoding each of the RGB color channels separately. Thus, the block stats unit 730 is configured to determine separate statistical measurements and final bit allocation for each channel of pixel values, when applicable. It should be appreciated that the example techniques depicted in FIGS. 9A-9B are provided merely for illustration purposes. Disclosure of this Application may be described as being directed to the three channels of RGB color values, however, same or similar techniques may be applied to other types of pixel data described above. Moreover, the present techniques may be applied in the compression of any N-bit image, for example, a pixel region/block in an 8-bit color image, which may include RGB color channels/components.

Referring to FIG. 9A, the operations of the block stats unit 730 may begin at step 902 by determining the variance of the pixel values corresponding to each pixel channel and the channel-order for the pixel channels. The variance for each pixel channel of a pixel block is determined based on a mean (e.g., average) of the pixel values and a measure of the average degree to which the pixel values are different from the mean value. In general, higher variance means that there is a bigger spread of pixel values than those associated with lower variance. The channel-order specifies the prioritization of the pixel channels with respect to each other and is determined based on the variance of the pixel channels. For example, with respect to bit allocation, a pixel channel associated with higher variance may be prioritized before pixel channels associated with lower variance. At step 904, the block stats unit 730 determines the desired bit-allocation for each pixel channel based on the variance of the pixel values (e.g., bit allocation of [x, y, z]: "x" corresponding to the all of the red color components of the pixel region; "y" corresponding to the all of the green color components of the pixel region; and "z" corresponding to the all of the blue color components of the pixel region). In some embodiments, the desired bit-allocation for each pixel channel represents the number of bits required to encode the pixel values without any loss of information (i.e., lossless compression). At step 906, the block stats units 730 may determine the initial bit allocation based on a budget of bits allocated to each pixel channels of pixel blocks. For example, if each pixel block of an image is allocated a budget of 8 bits, the initial bit allocation represents the distribution of 8 bits across each pixel channel. At step 908, the block stats unit 730 determines the final bit-allocation for each of the pixel channels based on a credit-based system, which is explained in more detail below. An example processes of steps 902, 904, 906, and 908 are described next.

In an embodiment, the block stats unit 730 may begin analyzing a pixel block by calculating the color variances for each of the color components of the pixel block. For example, FIG. 9B illustrates an embodiment where the block stats unit 730 has determined that the red color component's variance is "3414", the green color component's variance is "2712", and the blue color component's variance is "3622," i.e., [3414, 2712, 3622]. The block stats unit 730 may then utilize a rate-control technique to determine a desired bit allocation for each color component based on the number of bits required to fully represent the color values (e.g., color variance). In the embodiment of FIG. 9B, the block stats unit 730 has determined that the desired bit allocation should be [5, 5, 5], since that would fully capture the color values of the pixel block (i.e., red color component is allocated 5 bits; green color component is allocated 5 bits; blue color component is allocated 5 bits). Then, the block stats unit 730 determines the initial bit allocation for the pixel block based on a budget assigned to the pixel block, which may be predetermined based on a target compression rate of the image. For example, in the embodiment illustrated in FIG. 9B, the block stats unit 730 has determined that, with a budget of 8 bits for the pixel block, the initial bit allocation should be [2, 4, 2], i.e., 2 bits for the red color component, 4 bits for the green color component, and 2 bits for the blue color component. In some embodiments, the number of bits allocated to each of the color components may be based on factors other than the variance. For example, a higher number of bits may be allocated to the green color components to account for the fact that human eyes may be able to detect more shades of green than other colors.

In an embodiment, after the initial bit allocation has been configured, the block stats unit 730 may use a credit based technique to allocate additional bits to each color component. The credit based technique involves maintaining a credit pool that stores information on the total number of bits underutilized by pixel blocks ("bit credit") so the underutilized bits can be provided to pixel blocks that require bit allocation in excess to the budget. For example, if pixel blocks of an image are each provided a budget of 8 bits, but the first pixel block only required 6 bits, then the underutilized 2 bits could be saved in the credit pool for any subsequent pixel blocks requiring more than the budget. On the other hand, if the desired bit allocation of a pixel block requires number of bits more than the budget, as illustrated in the embodiment of FIG. 9B, then the block stats unit 730 may allocate additional bits to the pixel block based on the availability of bit credits in the credit pool.

In an embodiment, the method of allocating available bit credits to a pixel block is based on the channel-order previously determined by the block stats unit 730. For example, in the embodiment of FIG. 9B, the channel-order has been determined as: (1) the blue color component, (2) the red color component, then (3) the green color component. If there are bit credits available to allocate to the pixel block, the bit credits are allocated by following the channel-order. FIG. 9B shows that available bit credits are first provided to the blue color component, then the red component, then the green components, then repeating the same distribution for additional bit credits until the credit pool is empty of bit credits or the desired bit allocation is reached.

FIG. 9B also shows the final bit allocation based on the various number of available bit credits in the credit pool. Although not illustrated, in accordance with the presently disclosed techniques, in scenarios where more than 7 bit credits are available in the credit pool, the extra available bit credits remain in the credit pool to be utilized for one or more next pixel blocks.

The final bit allocation for each channel of the pixel block represents the bin count that the pixel values will be encoded based upon, or otherwise referred herein as the number of quantization levels. The encode unit 760 unit encodes pixel block based on the quantization levels, which process is explained more below. In an embodiment, if the final bit allocation matches the desired bit allocation, the number of quantization levels may match, or be greater than, the number of discrete pixel values, of a particular channel. This means that the pixel block may be encoded/compressed in a lossless fashion since there are enough quantization levels to represent each of the discrete pixel values. If the final bit allocation does not match the desired bit allocation, there may not be sufficient number of quantization levels to represent each of the discrete pixel values. This means that the pixel block may be encoded/compressed in a lossy fashion. In such cases, the encode unit 760 incorporates a scale to the encoding process so each quantization level could represent a group of discrete pixel values (e.g., a scale of 3 indicates that each quantization level represents 3 discrete pixel values).

FIGS. 10A, 10B, and 10C illustrate RGB histograms 1000A, 1000B, and 1000C representing the endpoint selection process performed by the first endpoint unit 740 and the second endpoint unit 750. In an embodiment, the encoding process requires each quantization level to be mapped to a specific pixel value or a group of pixel values. Depending on where the quantization levels are mapped to, the visual quality of the encoded pixel blocks could vary. Thus, the first endpoint unit 740 and the second endpoint unit 750 provides a method of determining optimal endpoint pixel values that the quantization levels could be mapped to. The method involves comparing several candidate endpoint values and selecting the endpoints that provides the minimum distortions (e.g., quantization error, measured using sum of squared errors (SSE)), thereby improving visual quality of the encoded and compressed images. This method can be visualized in the RGB histograms illustrated in FIGS. 10A, 10B, and 10C. The x-axis of the RGB histograms 1000A, 1000B, and 1000C represents discrete pixel values, the y-axis represents the number of pixels associated with those particular pixel values, and the circles represent the placement of the quantization levels in association to particular pixel values of the x-axis.

In an embodiment, the first endpoint unit 740 selectively accesses pixel data stored in one of the slots of the ring buffer 710 to determine one of the endpoint values for the quantization levels. For each channel of the pixel block, the first endpoint unit 740 determines the first endpoint value by (1) fixing the second endpoint value to either the maximum or minimum pixel value, (2) selecting four candidate values for the first endpoint on the other end of the second endpoint, then (3) selecting the candidate value that results in the minimum quantization error. In some embodiments, more than, or less than, four candidate values may be selected. In some embodiments, determining whether to fix the second endpoint to the maximum or minimum pixel value depends on the distribution of the pixel values of the pixel block (of a particular pixel channel). If the distribution of the pixel values is skewed towards the higher end of the pixel values, the second endpoint may be fixed to the maximum pixel value and the candidate values for the first endpoint may be selected to include the minimum pixel value and several pixel values around the minimum value. If the distribution is skewed towards the lower end, the second endpoint may be fixed to the minimum pixel value and the candidate locations for the first endpoint may be selected to include the maximum pixel value and several pixel values around the maximum value.

In an embodiment, after selecting the candidate values for the endpoints, histograms may be computed for each pair of fixed endpoint and of the candidate endpoints and distortion produced by each pair could be compared to each other. Then, the candidate endpoint that produces the lowest distortion is selected as optimal. For example, FIGS. 10A, 10B, and 10C show three RGB histograms 1000A, 1000B, and 1000C with three different pairs of endpoints. Between RGB histograms 1000A (e.g., 620 SSE), 1000B (e.g., 390 SSE), and 1000C (e.g., 474 SSE), the RGB histogram 1000B (e.g., 390 SSE) may be selected as the most optimal because the selection of the RGB histogram 1000B (e.g., 390 SSE) leads to the lowest quantization error as compared to the RGB histogram 1000A (e.g., 620 SSE) and the RGB histogram 1000C (e.g., 474 SSE). Once the first optimal endpoint value is determined, the first optimal endpoint value is transmitted to the second endpoint unit 750 to allow the second endpoint unit 750 to determine the second endpoint value based on thereof.

In an embodiment, the second endpoint unit 750 selectively accesses pixel data stored in one of the slots of the ring buffer 710 to determine one of the endpoint values for the quantization levels. For each channel of the pixel block, the second endpoint unit 750 determines the second optimal endpoint value by (1) fixing the first endpoint value, which has been determined by the first endpoint unit 740 (2) selecting four candidate locations for the second endpoint value on the other end of the first endpoint (e.g., if the first endpoint corresponds to the maximum quantization level, then the second endpoint corresponds to the minimum quantization level, and vise versa), then (3) selecting the candidate location, in substantially the same manner as the operations of the first endpoint unit 740, that results in the minimum quantization error. In some embodiments, more, or less, than four candidate locations may be selected.

In an embodiment, once the first and second endpoints are selected for the quantization levels, the remaining quantization levels may be uniformly distributed between the endpoints, such as those illustrated in FIGS. 10A, 10B, and 10C. The first and second endpoints determined by the first and second endpoint units 740 and 750 may be transmitted to the encode unit 760.

Figure 11A:
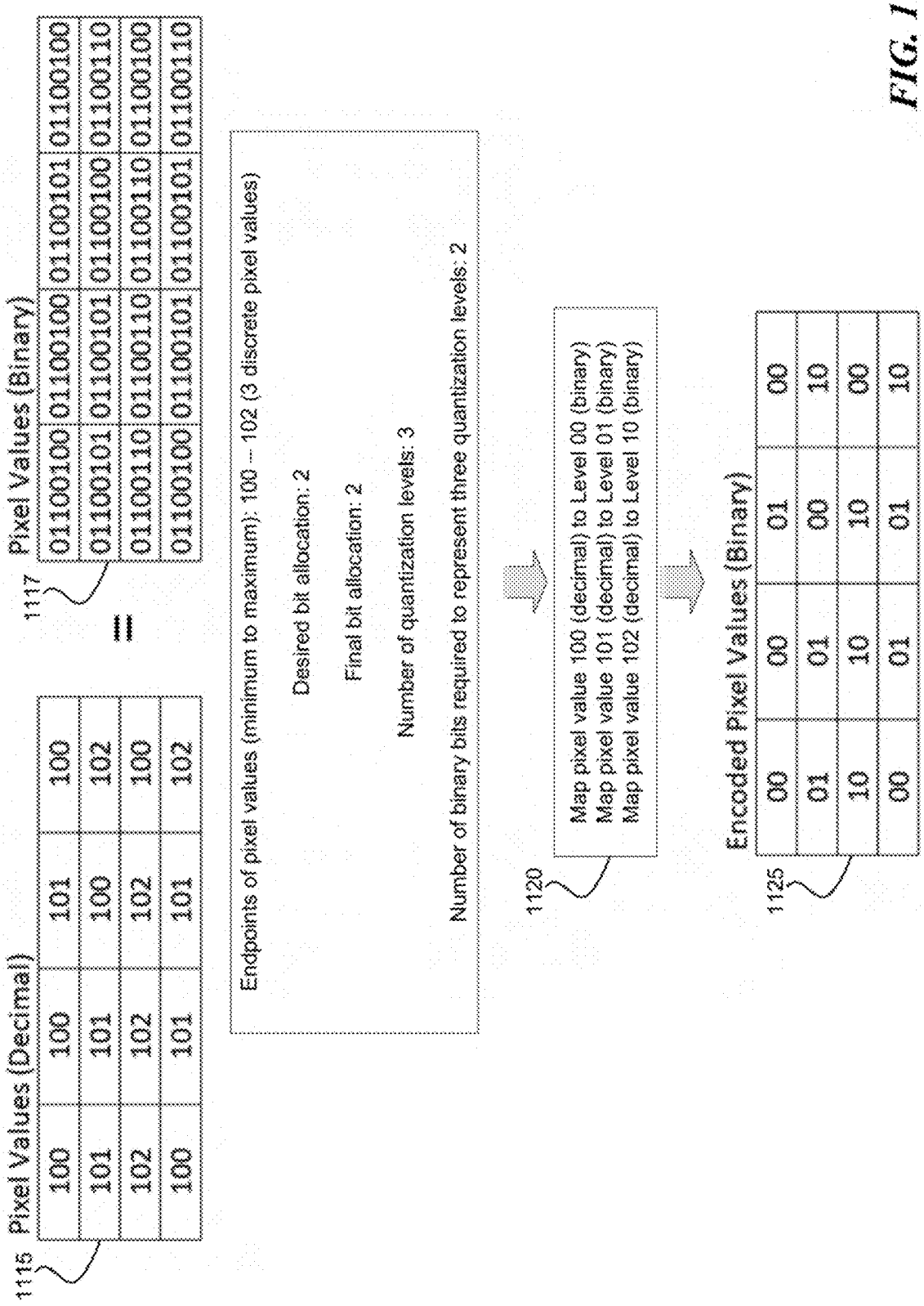

In an embodiment, once the block stats unit 730, the first endpoint unit 740, and the second endpoint unit 750 completes processing a pixel block, the encode unit 760 selectively accesses the pixel block from the slot of the ring buffer 710. Then, the encode unit 760 encodes the pixel block by leveraging the similarities between the pixel values within a pixel block to represent the pixel values with reduced number of binary bits. If the final bit allocation matches the desired bit allocation, the pixel values may be encoded in a lossless fashion such that each discrete pixel value within the pixel range is mapped to a specific quantization level. For example, FIG. 11A illustrates an example process of encoding a particular pixel channel of a pixel block 1115 in a lossless fashion. The pixel block 1115 comprises 3 discrete pixel values ranging from 100 to 102. Given that 3 discrete values can be represented by 2 binary bits, the desired bit allocation is determined as 2 bits. Assuming that the budget for this pixel block is 2 bits or more, the final bit allocation is also determined as 2 bits. Since the final bit allocation matches the desired bit allocation, each pixel value of the block can be encoded by mapping it to a corresponding quantization level, in accordance to the table 1120, resulting in the encoded pixel block 1125. This allows each of the pixel values to be represented by 2 binary bits instead of the 8 binary bits shown in the uncompressed pixel block 1117. In an embodiment, the decoding process involves adding the encoded pixel values to an offset value (e.g., minimum pixel value of the uncompressed pixel array 715). In some embodiments, the encoder system 700 may maintain a look-up table that maps each quantization level to a pixel value, allowing the encoded pixel values to be decoded based on thereof and without division operations.

In an embodiment, if the final bit allocation does not match the desired bit allocation, the pixel values may be encoded in a lossy fashion such that each quantization level is mapped to a group of discrete pixel values. For example, FIG. 11B illustrates an example process of encoding a particular pixel channel of a pixel block 1135 in a lossy fashion. The pixel block 1115 comprises 40 discrete pixel values ranging from 100 to 139. Given that 40 discrete values can be represented by 6 binary bits, the desired bit allocation is determined as 6 bits. Assuming that the budget for this pixel block is 3 bits and no credits bits are available, the final bit allocation is determined as 3 bits. Since the final bit allocation does not match the desired bit allocation, a scale of 5 is incorporated to the quantization levels so a group of 5 discrete pixel values can be mapped to each quantization level, in accordance to the table 1120, resulting in the encoded pixel block 1145. This allows each of the pixel values to be represented by 3 binary bits instead of the 8 binary bits shown in the uncompressed pixel block 1137. In an embodiment, the decoding process involves multiplying the encoded pixel values by the scale then adding them to an offset value (e.g., minimum pixel value of the uncompressed pixel array 1135). In some embodiments, the encoder system 700 may maintain a look-up table that maps each quantization level to a pixel value, allowing the encoded pixel values to be decoded based on thereof and without division operations.

In an embodiment, after the encode unit 760 encodes a pixel block, the encoded pixel block is transmitted to the packetize unit 770 and the interleave unit 780, along with metadata computed by the block stats unit 730. Then, the packetize unit 770 assembles the encoded pixels and corresponding headers into packets and the interleave unit 780 arranges the packets into a bitstream, based in part on the metadata.

Figure 12:
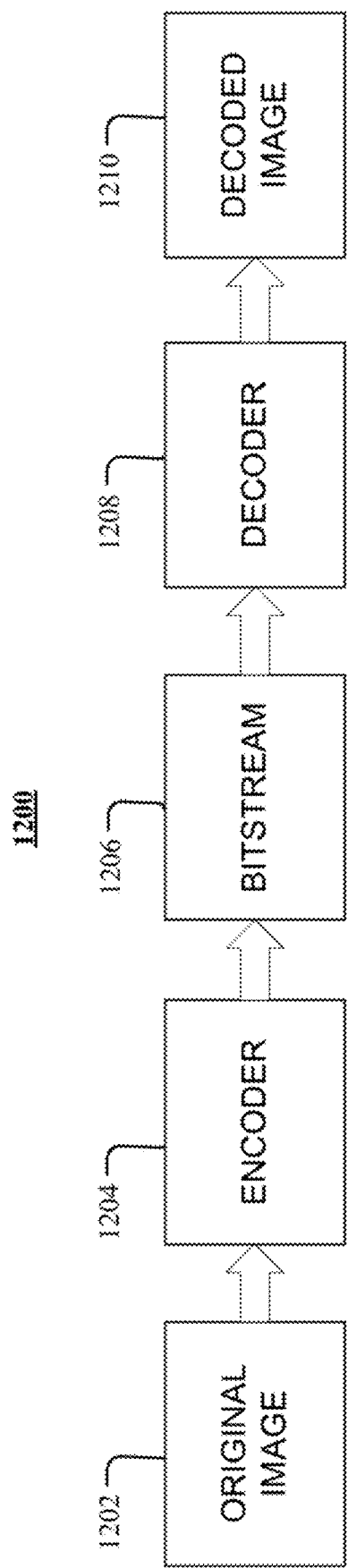
FIG. 12 illustrates an example encoder-decoder (codec) system.

FIG. 12 illustrates an encoder-decoder (codec) system 1200 that may be useful in performing forgoing techniques as discussed herein, in accordance with the presently disclosed embodiments. In some embodiments, the codec system 1200 may be implemented as part of a subsystem on one or more general purpose processors, or may include a standalone graphic processing units (GPU), an application-specific integrated circuit (ASIC), a system-on-chip (SoC), a microcontroller, a field-programmable gate array (FPGA), or any other processing device(s) that may be suitable for processing image data. As depicted in FIG. 12, in some embodiments, the data flow of the codec system 1200 may include receiving an original image 1202 to be encoded via an encoder device 1204, stored into a bitstream 1206, and decoded via a decoder device 1208 to generate a compressed and decoded image 1210 to be stored and/or transmitted.

Figure 13:
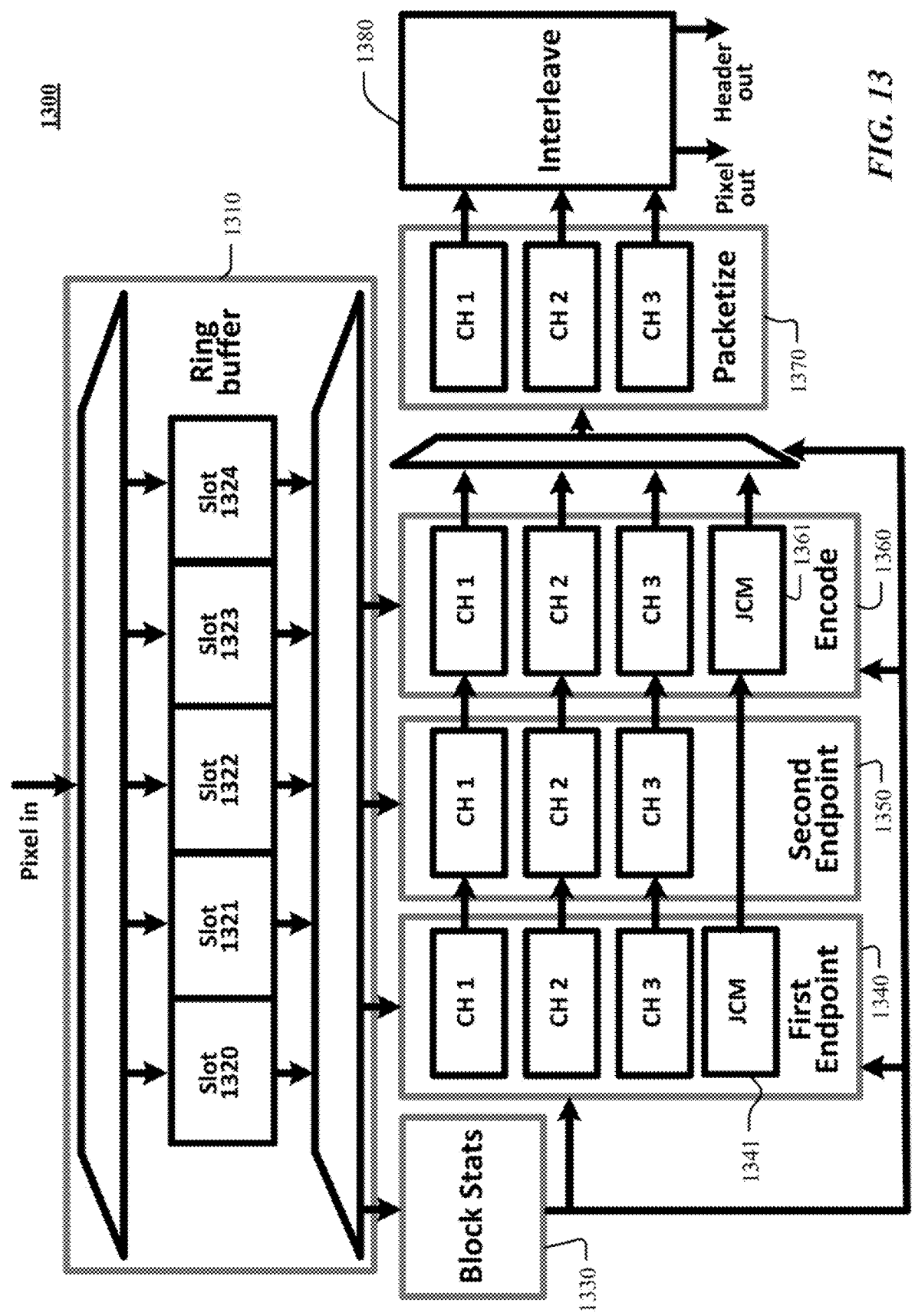
FIG. 13 illustrates an example encoder system capable of jointly encoding pixel channels.

FIG. 13 illustrates an embodiment of a modular architecture of an encoder system 1300. The encoder system 1300 is substantially similar to the encoder system 700 illustrated in FIG. 7, except that the encoder system 1300 is modified in such a way to allow the encoder system 1300 to encode pixels using either the joint-color mode ("JCM") or standard mode depending on the color correspondences of a pixel block. "Standard mode" as used herein refers to the encoding technique discussed herein with respect to the encoder system 700 shown in FIG. 7. As also discussed herein with references to FIGS. 4-6B, the joint-color mode refers to the technique for encoding the three channels of colors together if there are strong RGB color correspondences between pixels in a pixel block. If the RGB color correspondences are not sufficiently strong enough (e.g., not over a minimum threshold), the pixels color values may be encoded separately using the standard mode. One novel aspect of the encoder system 1300, amongst others, can be attributed to how the joint-color mode processes are separated and configured to fit within the various processing units of the encoder system 1300. This technique allows the encoder system 1300 to determine at the earliest possible opportunity whether a pixel block should be encoded using the joint-color mode or the standard mode, while still maintaining the encoding efficiency provided by the encoder architecture disclosed herein. In an embodiment, when the encoder system 1300 determines that a pixel block is to be encoded using the joint-color mode, then the processes for the standard mode may be not executed. For example, when encoding a pixel block using joint-color mode, the CH1, CH2, and CH3 of the first endpoint unit 1340 may not be executed and instead the JCM 1341 of the first endpoint unit 1340 may be executed. The same may be true for the encode unit 1360. Notably, when encoding a pixel block using the joint-color mode, processes corresponding to the second endpoint unit 1350 may be skipped since both endpoints for the pixel block may be calculated in the JCM 1341 of the first endpoint unit 1340. In an embodiment, when encoding a pixel block using the joint-color mode, the encoded data may be packetized in CH1 of packetize unit 1370, as discussed further below. In an embodiment, operations performed by the interleave unit 1380 may be substantially similar to the operations performed by the interleave unit 780 of the encoder system 700.

Figure 14:
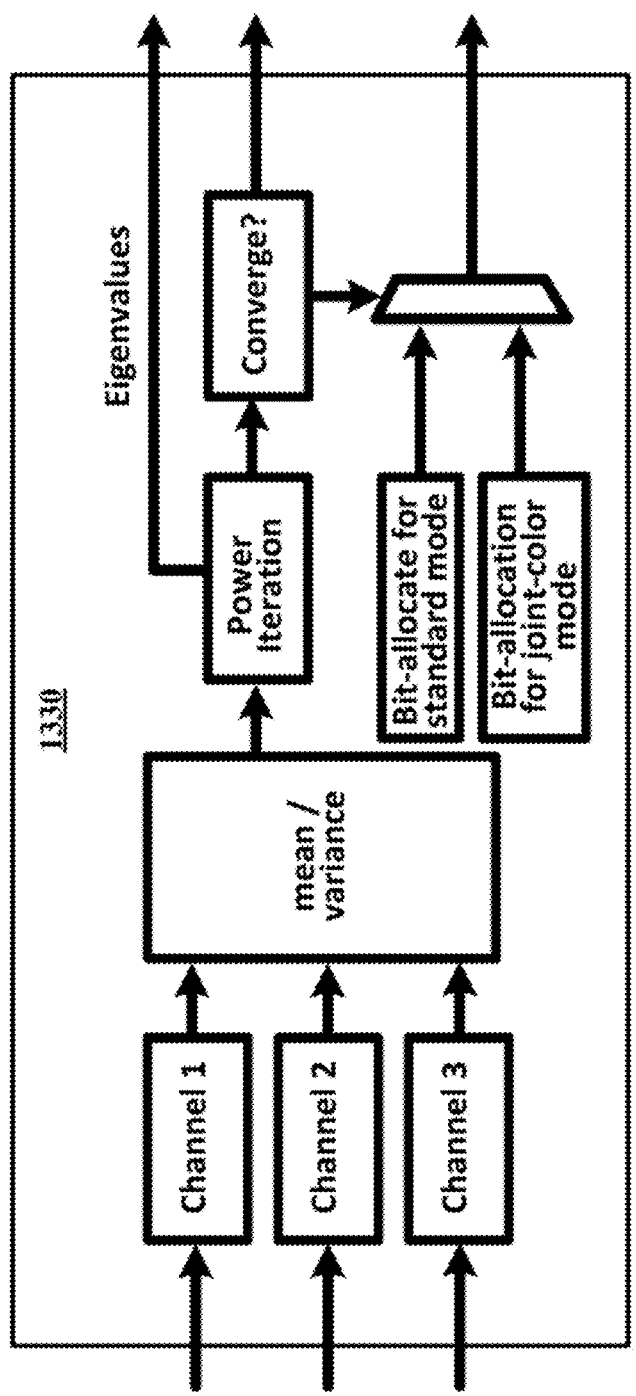
FIG. 14 illustrates an example component of an encoder system.

FIG. 14 illustrates a block stats unit 1330 of the encoder system 1300. In an embodiment, a block stats unit 1330 of the encoder system 1300 may be configured to determine whether to encode a pixel block using the standard mode or the joint-color mode. The block stats unit 1330 may be configured to first retrieve information associated with a pixel block from a corresponding slot (e.g., 1320, 1321, 1322, 1323, 1324 in FIG. 13) in the ring buffer 1310. In an embodiment, the retrieved information may comprise a "filter-cfg" parameter that indicates whether any particular channel is inactive (e.g., associated with missing/null values). For any inactive channel, the block stats unit 1330 may be configured to mask the values, for example, with 0 value, such that downstream processes can simply use the marked value rather than retrieving the pixel values associated with that channel. For any active channels, the block stats unit 1330 may be configured to retrieve the pixel data stored in the corresponding slot. In other embodiments, the block stats unit 1330 may be configured to retrieve the information associated with the pixel block and the pixel data without regards to determining whether any channels are inactive.

In an embodiment, the block stats unit 1330 may be configured to compute the mean for each channel and also the covariance between the channels (e.g., covariances between Red and Green channels, Red and Green channels, and Green and Blue channels). Based on the mean and covariances between the channels, the block stats unit 1330 may be configured to compute the eigenvalues and use the power iteration technique to determine whether the largest eigenvalue converges, as disclosed above with reference to the joint-color mode. If the largest eigenvalue converges, the block stats unit 1330 may be configured to determine that the joint-color mode is appropriate for encoding the pixel block. If the largest eigenvalue does not converge, the block stats unit 1330 may be configured to determine that the standard mode is appropriate for encoding the pixel block. After determining the appropriate encoding mode for the pixel block, the block stats unit 1330 may be configured to calculate the number of bits that may be required to encode the pixel block, and this information may be used for a credit-base system that is substantially similar to the credit-based system discussed herein with respect to FIGS. 9A and 9B. In an embodiment, the bit-allocation for the credit-base system for the standard mode and the joint-color mode may be separately maintained, as shown in FIG. 14. In an embodiment, the bit-allocation information may be provided to the first endpoint unit 1340.

Notably, in an embodiment, the eigenvector (as opposed to the eigenvalue) and the rest of the calculations needed to encode the pixel values using the joint-color mode may be pushed off to a subsequent processing unit of the encoder system 1300 to mitigate the risk of causing a computing bottleneck in the block stats unit 1330. To that end, the block stats unit 1330 may be configured to provide the raw eigenvalues to the next processing unit of the encoder—the first endpoint unit 1340—for further processing. In an embodiment, raw eigenvalues may be eigenvalues that have not been normalized.

Figure 15:
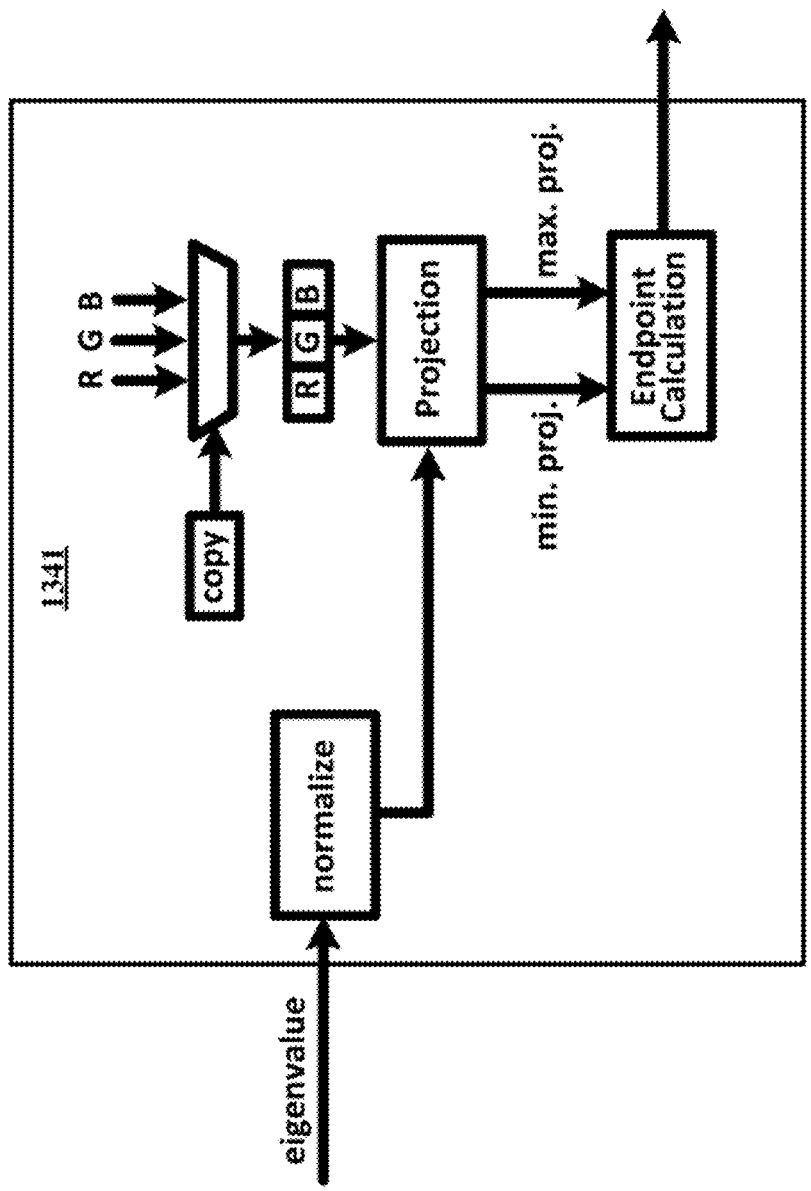
FIG. 15 illustrates an example component of an encoder system.

FIG. 15 illustrates a JCM 1341 of the first endpoint unit 1340 of the encoder system 1300. The JCM 1341 may be configured to, when encoding a pixel block with the joint-color mode, normalize the raw eigenvalues received from the block stats unit 1330 and calculate the eigenvector. In an embodiment, a JCM 1341 may be configured to retrieve the RGB pixel values from a corresponding slot in the ring buffer 1310. In an embodiment, if any channel of pixel values is missing, one of the existing channel of pixel values may be copied to the missing channel of pixel values. For example, if the Red channel is missing, the Green pixel values may be copied to the Red channel. In an embodiment, the JCM 1341 may be configured to calculate the projection of the RGB pixel values on the eigenvector. The JCM 1341 may then use the projections to determine the endpoints for the joint-color mode, for example the minimum projection corresponds to the one endpoint value and the maximum projection corresponds to another endpoint values, for each pixel channel. Notably, since the joint-color mode is used to jointly encode all channels together, only one instance of end point calculations is need, which contrasts the standard mode that requires separate instances of calculations for each of the channels. In an embodiment, the JCM 1341 may be configured to pass on the endpoint calculations to the next processing unit of the encoder system 1300. As illustrated in FIG. 13, when encoding a pixel block using the joint-color mode, the second endpoint unit 1350 may be bypassed since both endpoints are calculated in the first endpoint unit 1340 (e.g., JCM 1341) and because endpoint optimization is not necessary for the joint-color mode, which contrasts the standard mode. When the second endpoint unit 1350 is bypassed, the information calculated/determined by the first endpoint unit 1340 may be passed through the second endpoint unit 1350 without any further processing and transmitted to the encode unit 1360.

In an embodiment, the JCM 1361 of the encode unit 1360 of the encoder system 1300 may be configured to retrieve the pixel values of a pixel block from a corresponding slot in the ring buffer 1310 then jointly encode the pixel block according to the metadata computed by the block stats unit 1330 and the first endpoint unit 1340. The JCM 1361 may be configured to compute the eigen step size, estimate the projections corresponding to all the precision levels, and determine the encoded result based on finding the level whose projection is the closest to the projection of incoming RGB pixels. The process of jointly encoding the pixel channels is substantially similar to the encoding process discussed with reference to FIGS. 4-6B. But again, in contrast to the standard mode where multiple instances of processing may be required for each of the channels, only one instance of processing by the JCM 1361 may be required.

In an embodiment, the packetize unit 1370 may be configured to, when encoding a pixel block using joint-color mode, receive the encoded data from the encode unit 1360 and the metadata computed by the block stats unit 1330 then packetize the encoded data. For joint-color mode, the packetize unit 1370 may be configured to route the encoded data to CH 1 of the packetize unit 1370. Then, the packetize unit 1370 may be configured to packetize the encoded data and generate a header for the encoded data. The packetize unit 1370 may be configured to generate headers in both CH2 and CH3 of the packetize unit 1370 even though no data is routed through CH2 and CH3.

In an embodiment, when encoding a pixel block using joint-color mode, the interleave unit 1380 may be configured to receive the packetized data from the packetize unit 1370 and the metadata computed by the block stats unit 1330 then arrange the packetized data into a bitstream.

Figure 16:
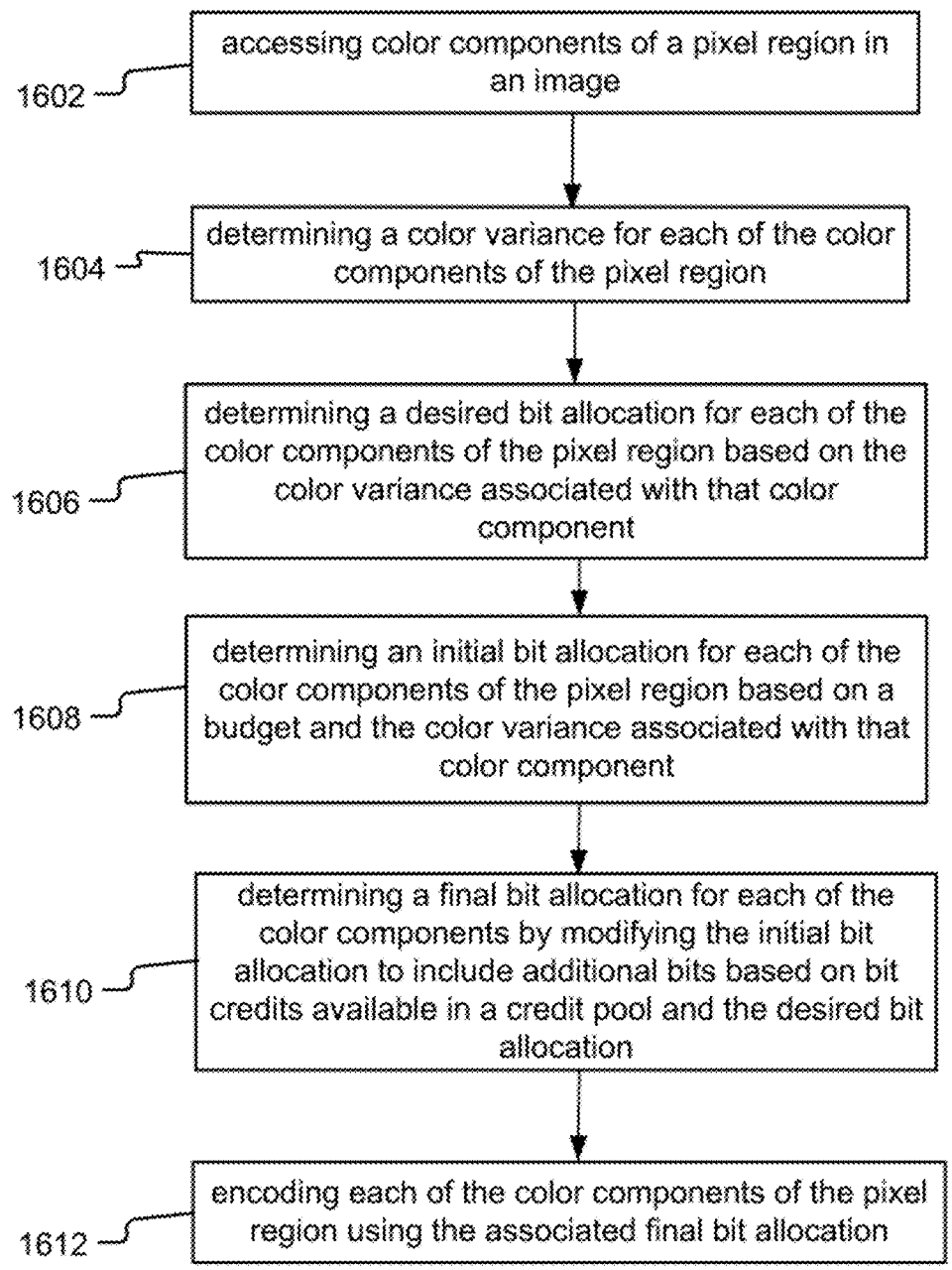
FIG. 16 illustrates an example method for functions implementing a bit-credit system.

FIG. 16 illustrates is a flow diagram of a method 1600 for encoding individual color components separately and providing a compression rate control method of allocating available bits to different RGB color components based on the amount of color information included in each of the three RGB color components of each pixel per pixel block, in accordance with the presently disclosed embodiments. The method 1600 may be performed utilizing one or more processors (e.g., block stats unit 730) that may include hardware (e.g., a general purpose processor, a graphic processing units (GPU), an application-specific integrated circuit (ASIC), a system-on-chip (SoC), a microcontroller, a field-programmable gate array (FPGA), or any other processing device(s) that may be suitable for processing image data), software (e.g., instructions running/executing on one or more processors), firmware (e.g., microcode), or any combination thereof.

The method 1600 may begin at block 1602 with one or more processors (e.g., block stats unit 730) accessing color components of a pixel region in an image (e.g., a pixel block) from a slot of the ring buffer 710. For example, in one embodiment, the image may include an N-bit color image (e.g., 8-bit color image), which may include red (R) color components, green (G) color components, and blue (B) color components to be compressed and stored and/or transmitted, for example. The method 1600 may continue at block 1604 with the one or more processors (e.g., block stats unit 730) determining a color variance for each of the color components of the pixel region. For example, in certain embodiments, the block stats unit 730 may perform a pre-analysis of the of the N-bit color image (e.g., on a pixel region by pixel region basis) and determine a mean (e.g., an average of the total pixel value) and a variance (e.g., a measure of the average degree to which each RGB color component is different from the mean value) with respect to each of the RGB color components of each pixel per pixel region. The block stats unit 730 may also determine the channel-order (e.g., prioritization of the color components), in accordance to the above embodiments.

The method 1600 may then continue at block 1606 with the one or more processors (e.g., block stats unit 730) determining a desired bit allocation for each of the color components of the pixel region based on the color variance associated with that color component. For example, in some embodiments, the block stats unit 730 may determine a desired bit allocation [x, y, z] (e.g., x—corresponding to the all of the red color components of the pixel region; y—corresponding to the all of the green color components of the pixel region; and z—corresponding to the all of the blue color components of the pixel region) for encoding each of the RGB color components of the pixel region based on the color variance associated with each of the RGB color components. The method 1600 may then continue at block 1608 with the one or more processors (e.g., block stats unit 730) determining an initial bit allocation for each of the color components of the pixel region based on a budget and the color variance associated with that color component. For example, in some embodiments, if a budget of 8 bits is assigned to each pixel block of an image and if red color component has the largest variance and blue and green color components have similar variances, then the block stats unit 730 may determine the initial bit allocation as [4, 2, 2].

The method 1600 may then continue at block 1610 with the one or more processors (e.g., block stats unit 730) determining a final bit allocation for each of the color components by modifying the initial bit allocation to include additional bits based on bit credits available in a credit pool and the desired bit allocation. Continuing the example above where the initial bit allocation was determined as [4, 2, 2], if the desired bit allocation is [5, 3, 3] and there are 3 or more bit credits available in a credit pool, then additional bits may be allocated to the color components so the final bit allocation matches the desired bit allocation.

FIG. 17 illustrates an example method 1700 for encoding an image by leveraging a ring buffer to process multiple pixel blocks in parallel and reduce computational costs by minimizing the data movement of the pixel blocks. The method may begin at step 1701 by temporarily storing, by each of a plurality of slots of a ring buffer, a pixel block of a plurality of pixels blocks of an image until the pixel block is encoded. At step 1702, the method may continue by performing, by a plurality of processor units connected in series, different encoding operations in an encoding pipeline, each processor unit configured to selectively access the pixel block from a slot of the plurality of slots to determine characteristics of the accessed pixel block, wherein the plurality of processing units are configured to sequentially obtain access to a slot of the plurality of slots and concurrently process the pixel blocks stored in different ones of the plurality of slots. At step 1703, the method may continue by selectively accessing and encoding, by an encoder unit, the pixel block stored in a slot of the plurality of slots based on the characteristics of the pixel block determined by the plurality of processing units. Particular embodiments may repeat one or more steps of the method of FIG. 17, where appropriate. Although this disclosure describes and illustrates particular steps of the method of FIG. 17 as occurring in a particular order, this disclosure contemplates any suitable steps of the method of FIG. 17 occurring in any suitable order. Moreover, although this disclosure describes and illustrates an example method for encoding an image by leveraging a ring buffer to temporarily store multiple pixel blocks of the image to minimize data movement during the encoding process, this disclosure contemplates any suitable method for encoding an image by leveraging a ring buffer, including any suitable steps, which may include all, some, or none of the steps of the method of FIG. 17, where appropriate. Furthermore, although this disclosure describes and illustrates particular components, devices, or systems carrying out particular steps of the method of FIG. 17, this disclosure contemplates any suitable combination of any suitable components, devices, or systems carrying out any suitable steps of the method of FIG. 17.

Figure 18:
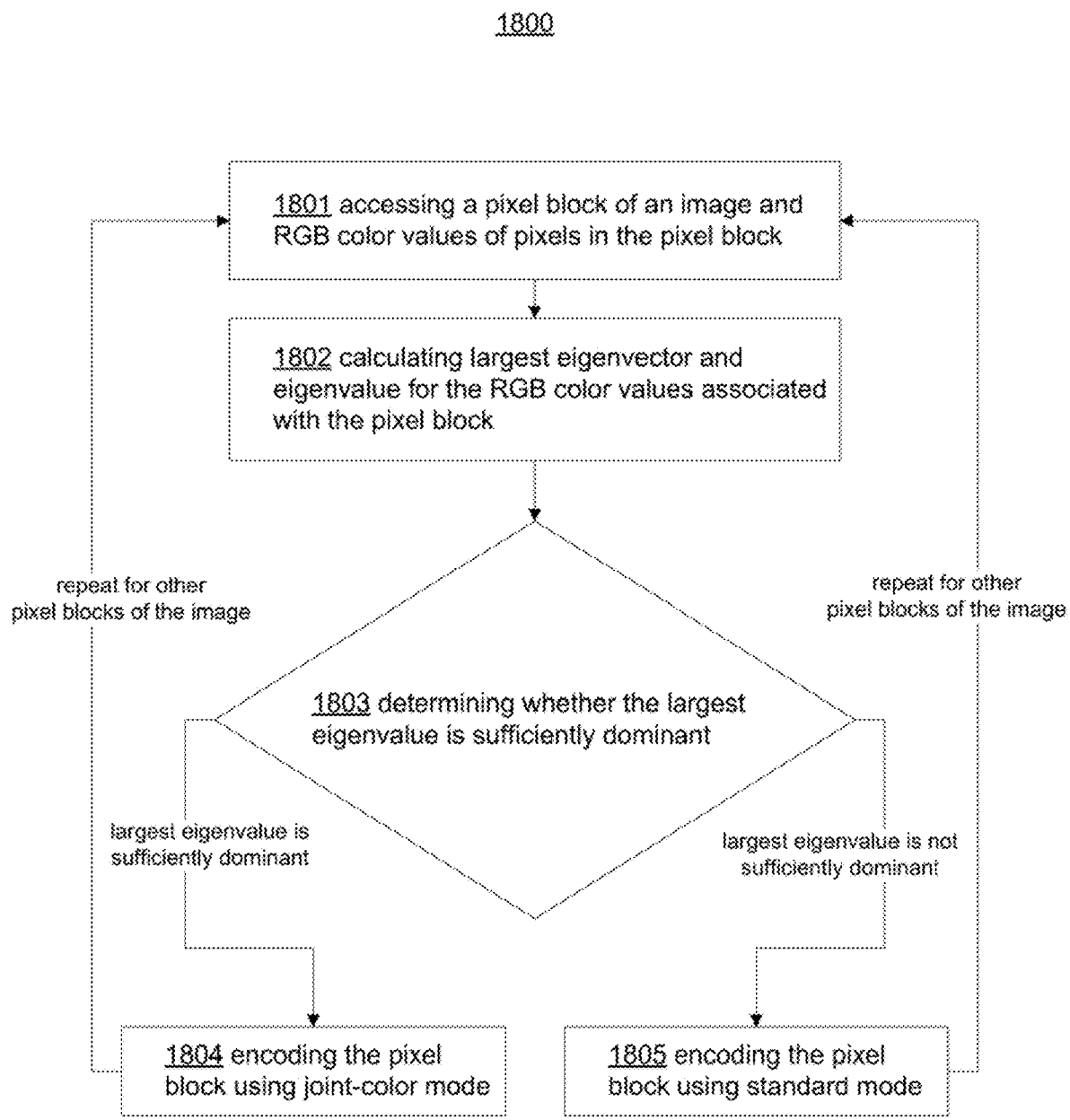
FIG. 18 illustrates an example method for jointly encoding pixel channels.

FIG. 18 illustrates an example method 1800 for selectively encoding pixel blocks of an image based on joint-color mode. The method may begin at step 1801 by accessing a pixel block of an image and RGB color values of the pixels in the pixel block. At step 1802, the method may continue by calculating the largest eigenvectors and eigenvalues for the RGB color values associated with the pixel block. At step 1803, the method may continue by determining whether the largest eigenvalue is sufficiently dominant. If the largest eigenvalue is sufficiently dominant, at step 1804, the method may continue by encoding the pixel block using joint-color mode. If the largest eigenvalue is not sufficiently dominant, at step 1805, the method may continue by encoding the pixel block using standard mode. Then, the method 1800 may repeat for other pixel blocks of the image until all of the pixel blocks of the image are encoded either by the joint-color mode or the standard mode. Particular embodiments may repeat one or more steps of the method of FIG. 18, where appropriate. Although this disclosure describes and illustrates particular steps of the method of FIG. 18 as occurring in a particular order, this disclosure contemplates any suitable steps of the method of FIG. 18 occurring in any suitable order. Moreover, although this disclosure describes and illustrates an example method for selectively encoding pixel blocks of an image based on joint-color mode, this disclosure contemplates any suitable method for selectively encoding pixel blocks of an image based on joint-color mode including any suitable steps, which may include all, some, or none of the steps of the method of FIG. 18, where appropriate. Furthermore, although this disclosure describes and illustrates particular components, devices, or systems carrying out particular steps of the method of FIG. 18, this disclosure contemplates any suitable combination of any suitable components, devices, or systems carrying out any suitable steps of the method of FIG. 18.

Figure 19:
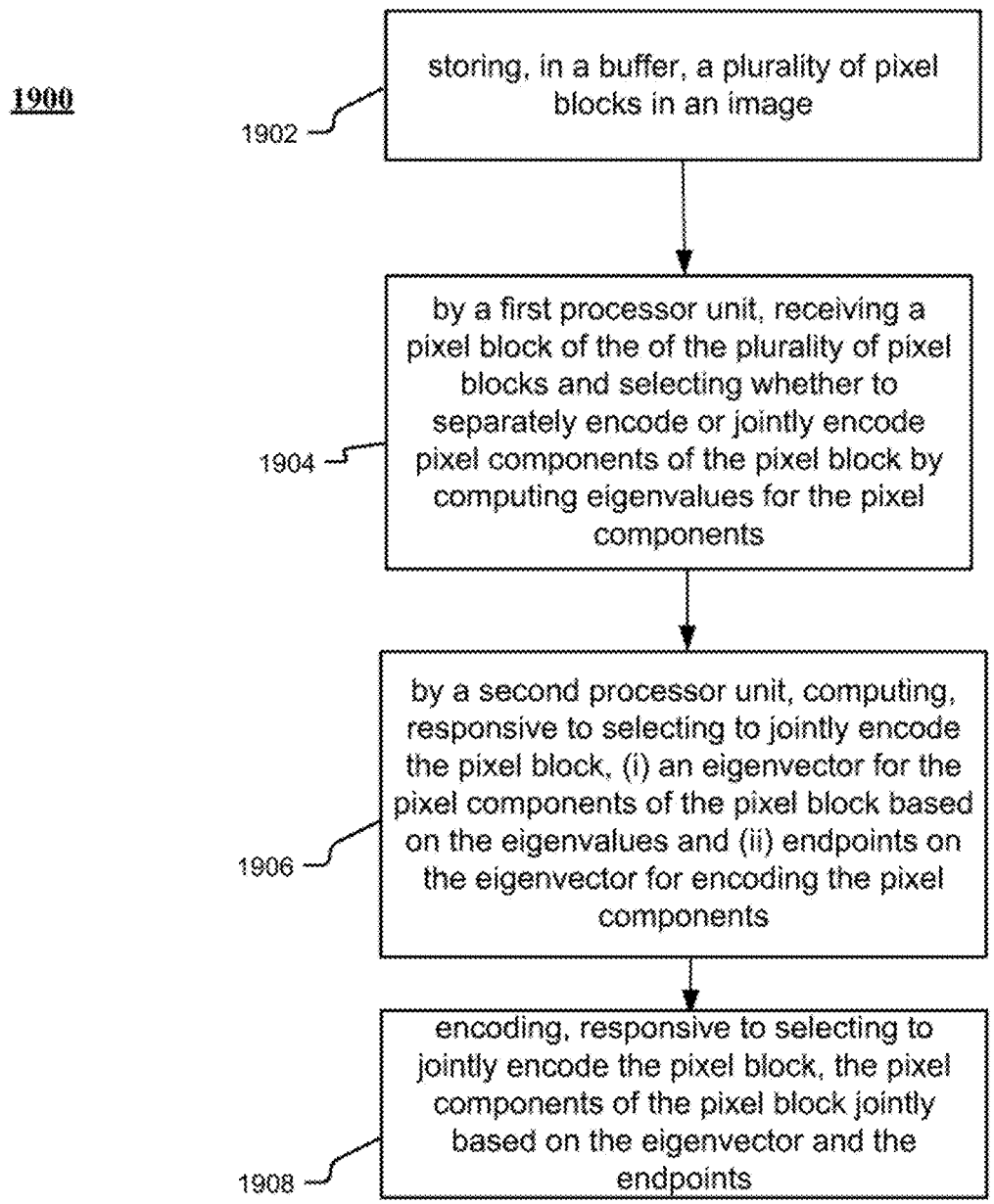
FIG. 19 illustrates an example method for encoding a pixel block using an encoder system.

FIG. 19 illustrates an example method 1900 for encoding pixel blocks. The method may begin at step 1902 by storing, in a buffer, a plurality of pixel blocks in an image. At step 1904, the method may continue by, by a first processor unit, receiving a pixel block of the of the plurality of pixel blocks and selecting whether to separately encode or jointly encode pixel components of the pixel block by computing eigenvalues for the pixel components. At step 1906, the method may continue by, by a second processor unit, computing, responsive to selecting to jointly encode the pixel block, (i) an eigenvector for the pixel components of the pixel block based on the eigenvalues and (ii) endpoints on the eigenvector for encoding the pixel components. At step 1908, the method may continue by encoding, responsive to selecting to jointly encode the pixel block, the pixel components of the pixel block jointly based on the eigenvector and the endpoints. Particular embodiments may repeat one or more steps of the method of FIG. 19, where appropriate. Although this disclosure describes and illustrates particular steps of the method of FIG. 19 as occurring in a particular order, this disclosure contemplates any suitable steps of the method of FIG. 19 occurring in any suitable order. Moreover, although this disclosure describes and illustrates an example method for encoding pixel blocks, this disclosure contemplates any suitable method for encoding pixel blocks, including any suitable steps, which may include all, some, or none of the steps of the method of FIG. 19, where appropriate. Furthermore, although this disclosure describes and illustrates particular components, devices, or systems carrying out particular steps of the method of FIG. 19, this disclosure contemplates any suitable combination of any suitable components, devices, or systems carrying out any suitable steps of the method of FIG. 19.

Figure 20:
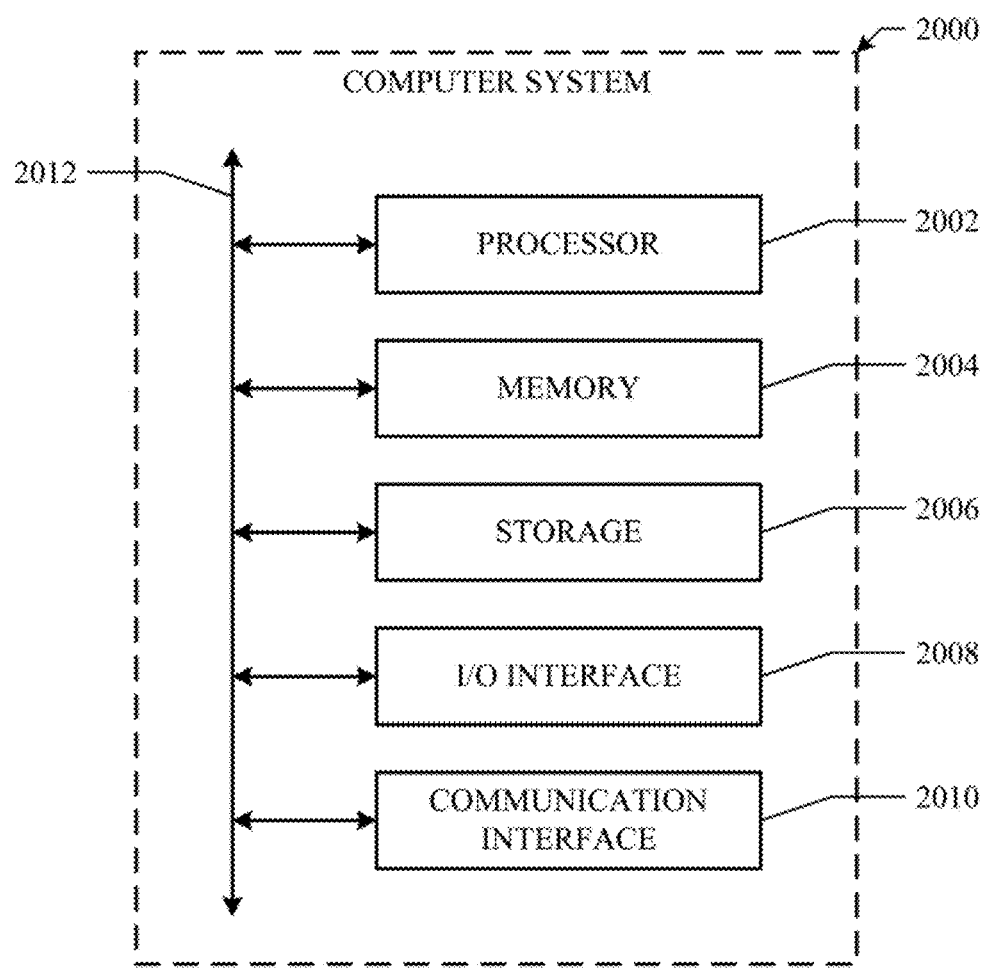
FIG. 20 illustrates an example computer system.

FIG. 20 illustrates an example computer system 2000 that may be useful in performing one or more of the foregoing techniques as presently disclosed herein. In particular embodiments, one or more computer systems 2000 perform one or more steps of one or more methods described or illustrated herein. In particular embodiments, one or more computer systems 2000 provide functionality described or illustrated herein. In particular embodiments, software running on one or more computer systems 2000 performs one or more steps of one or more methods described or illustrated herein or provides functionality described or illustrated herein. Particular embodiments include one or more portions of one or more computer systems 2000. Herein, reference to a computer system may encompass a computing device, and vice versa, where appropriate. Moreover, reference to a computer system may encompass one or more computer systems, where appropriate.

This disclosure contemplates any suitable number of computer systems 2000. This disclosure contemplates computer system 2000 taking any suitable physical form. As example and not by way of limitation, computer system 2000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 2000 may include one or more computer systems 2000; be unitary or distributed; span multiple locations; span multiple machines; span multiple data centers; or reside in a cloud, which may include one or more cloud components in one or more networks. Where appropriate, one or more computer systems 2000 may perform without substantial spatial or temporal limitation one or more steps of one or more methods described or illustrated herein.

As an example, and not by way of limitation, one or more computer systems 2000 may perform in real time or in batch mode one or more steps of one or more methods described or illustrated herein. One or more computer systems 2000 may perform at different times or at different locations one or more steps of one or more methods described or illustrated herein, where appropriate. In certain embodiments, computer system 2000 includes a processor 2002, memory 2004, storage 2006, an input/output (I/O) interface 2008, a communication interface 2010, and a bus 2012. Although this disclosure describes and illustrates a particular computer system having a particular number of particular components in a particular arrangement, this disclosure contemplates any suitable computer system having any suitable number of any suitable components in any suitable arrangement.

In certain embodiments, processor 2002 includes hardware for executing instructions, such as those making up a computer program. As an example, and not by way of limitation, to execute instructions, processor 2002 may retrieve (or fetch) the instructions from an internal register, an internal cache, memory 2004, or storage 2006; decode and execute them; and then write one or more results to an internal register, an internal cache, memory 2004, or storage 2006. In particular embodiments, processor 2002 may include one or more internal caches for data, instructions, or addresses. This disclosure contemplates processor 2002 including any suitable number of any suitable internal caches, where appropriate. As an example, and not by way of limitation, processor 2002 may include one or more instruction caches, one or more data caches, and one or more translation lookaside buffers (TLBs). Instructions in the instruction caches may be copies of instructions in memory 2004 or storage 2006, and the instruction caches may speed up retrieval of those instructions by processor 2002.

Data in the data caches may be copies of data in memory 2004 or storage 2006 for instructions executing at processor 2002 to operate on; the results of previous instructions executed at processor 2002 for access by subsequent instructions executing at processor 2002 or for writing to memory 2004 or storage 2006; or other suitable data. The data caches may speed up read or write operations by processor 2002. The TLBs may speed up virtual-address translation for processor 2002. In particular embodiments, processor 2002 may include one or more internal registers for data, instructions, or addresses. This disclosure contemplates processor 2002 including any suitable number of any suitable internal registers, where appropriate. Where appropriate, processor 2002 may include one or more arithmetic logic units (ALUs); be a multi-core processor; or include one or more processors 602. Although this disclosure describes and illustrates a particular processor, this disclosure contemplates any suitable processor.

In certain embodiments, memory 2004 includes main memory for storing instructions for processor 2002 to execute or data for processor 2002 to operate on. As an example, and not by way of limitation, computer system 2000 may load instructions from storage 2006 or another source (such as, for example, another computer system 2000) to memory 2004. Processor 2002 may then load the instructions from memory 2004 to an internal register or internal cache. To execute the instructions, processor 2002 may retrieve the instructions from the internal register or internal cache and decode them. During or after execution of the instructions, processor 2002 may write one or more results (which may be intermediate or final results) to the internal register or internal cache. Processor 2002 may then write one or more of those results to memory 2004. In particular embodiments, processor 2002 executes only instructions in one or more internal registers or internal caches or in memory 2004 (as opposed to storage 2006 or elsewhere) and operates only on data in one or more internal registers or internal caches or in memory 2004 (as opposed to storage 2006 or elsewhere).

One or more memory buses (which may each include an address bus and a data bus) may couple processor 2002 to memory 2004. Bus 2012 may include one or more memory buses, as described below. In particular embodiments, one or more memory management units (MMUs) reside between processor 2002 and memory 2004 and facilitate accesses to memory 2004 requested by processor 2002. In particular embodiments, memory 2004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 2004 may include one or more memories 2004, where appropriate. Although this disclosure describes and illustrates particular memory, this disclosure contemplates any suitable memory.

In particular embodiments, storage 2006 includes mass storage for data or instructions. As an example, and not by way of limitation, storage 2006 may include a hard disk drive (HDD), a floppy disk drive, flash memory, an optical disc, a magneto-optical disc, magnetic tape, or a Universal Serial Bus (USB) drive or a combination of two or more of these. Storage 2006 may include removable or non-removable (or fixed) media, where appropriate. Storage 2006 may be internal or external to computer system 2000, where appropriate. In particular embodiments, storage 2006 is non-volatile, solid-state memory. In certain embodiments, storage 2006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 2006 taking any suitable physical form. Storage 2006 may include one or more storage control units facilitating communication between processor 2002 and storage 2006, where appropriate. Where appropriate, storage 2006 may include one or more storages 2006. Although this disclosure describes and illustrates particular storage, this disclosure contemplates any suitable storage.

In certain embodiments, I/O interface 2008 includes hardware, software, or both, providing one or more interfaces for communication between computer system 2000 and one or more I/O devices. Computer system 2000 may include one or more of these I/O devices, where appropriate. One or more of these I/O devices may enable communication between a person and computer system 2000. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 2008 for them. Where appropriate, I/O interface 2008 may include one or more device or software drivers enabling processor 2002 to drive one or more of these I/O devices. I/O interface 2008 may include one or more I/O interfaces 2008, where appropriate. Although this disclosure describes and illustrates a particular I/O interface, this disclosure contemplates any suitable I/O interface.

In certain embodiments, communication interface 2010 includes hardware, software, or both providing one or more interfaces for communication (such as, for example, packet-based communication) between computer system 2000 and one or more other computer systems 2000 or one or more networks. As an example, and not by way of limitation, communication interface 2010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 2010 for it.

As an example, and not by way of limitation, computer system 2000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 2000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 2000 may include any suitable communication interface 2010 for any of these networks, where appropriate. Communication interface 2010 may include one or more communication interfaces 2010, where appropriate. Although this disclosure describes and illustrates a particular communication interface, this disclosure contemplates any suitable communication interface.

In certain embodiments, bus 2012 includes hardware, software, or both coupling components of computer system 2000 to each other. As an example and not by way of limitation, bus 2012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 2012 may include one or more buses 2012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system for encoding pixel blocks, the system comprising:
   a buffer configured to store a plurality of pixel blocks of an image;
   a block stats unit, including a first processor, configured to receive a pixel block of the plurality of pixel blocks and select whether to separately encode or jointly encode pixel components of the pixel block by computing eigenvalues for the pixel components;
   a first endpoint unit, including a second processor distinct from the first processor, configured to compute, responsive to the first processing unit selecting to jointly encode the pixel block, (i) an eigenvector for the pixel components of the pixel block based on the eigenvalues and (ii) endpoints on the eigenvector for encoding the pixel components;
   a second endpoint unit, including a third processor distinct from the first processor and the second processor, configured to, responsive to the block stats unit selecting to jointly encode the pixel block, forgo processing the endpoints and the eigenvector; and
   an encode unit configured to encode, responsive to the first processor selecting to jointly encode the pixel block, the pixel components of the pixel block jointly based on the eigenvector and the endpoints.

2. The system of claim 1, wherein the block stats unit is configured to select whether to separately encode or jointly encode pixel components of the pixel block further by determining that one of the eigenvalues converges.

3. The system of claim 1, wherein forgoing processing the endpoints and the eigenvector includes receiving information computed by the first endpoint unit and transmitting the information to the encode unit without processing the information at the second endpoint unit, wherein the information includes the endpoints and the eigenvector.

4. The system of claim 1, wherein the first endpoint unit is further configured to, responsive to the block stats unit selecting to separately encode, compute a first endpoint of pixel values associated with each pixel component of the pixel block, and wherein the second endpoint unit is configured to, responsive to the block stats unit selecting to separately encode, compute a second endpoint of pixel values associated with each pixel component of the pixel block.

5. The system of claim 4, wherein the encode unit is further configured to, responsive to the block stats unit selecting to separately encode, encode the pixel components of the pixel block separately based on the respective first endpoints and the respective second endpoints.

6. The system of claim 1, wherein the block stats unit is further configured to determine means and covariances associated with the pixel components of the pixel block, and wherein encoding the pixel components of the pixel block jointly is further based on the respective mean and the respective covariances.

7. The system of claim 1, further comprising:
a packetize unit configured to, after the encode unit encodes the pixel components of the pixel block jointly, assemble the pixel components into one or more packets, based in part on metadata associated with the pixel block.

8. A method for encoding pixel blocks, comprising:
storing, in a buffer, a plurality of pixel blocks in an image;
by a block stats unit, including a first processor, receiving a pixel block of the plurality of pixel blocks and selecting whether to separately encode or jointly encode pixel components of the pixel block by computing eigenvalues for the pixel components;
by a first endpoint unit, including a second processor distinct from the first processor, computing, responsive to selecting to jointly encode the pixel block, (i) an eigenvector for the pixel components of the pixel block based on the eigenvalues and (ii) endpoints on the eigenvector for encoding the pixel components;
by a second endpoint unit, including a third processor distinct from the first processor and the second processor, responsive to the block stats unit selecting to jointly encode the pixel block, forgoing processing the endpoints and the eigenvector; and
by an encode unit, encoding, responsive to selecting to jointly encode the pixel block, the pixel components of the pixel block jointly based on the eigenvector and the endpoints.

9. The method of claim 8, wherein selecting whether to separately encode or jointly encode pixel components of the pixel block is further based on determining that one of the eigenvalues converges.

10. The method of claim 8, wherein forgoing processing the endpoints and the eigenvector includes:
receiving information computed by the first endpoint unit and transmitting the information to the encode unit without processing the information by the second endpoint unit, wherein the information includes the endpoints and the eigenvector.

11. The method of claim 8, further comprising:
by the first endpoint unit, responsive to the block stats unit selecting to separately encode, computing a first endpoint of pixel values associated with each pixel component of the pixel block; and
by the second endpoint unit, responsive to the block stats unit selecting to separately encode, computing a second endpoint of pixel values associated with each pixel component of the pixel block.

12. The method of claim 11, further comprising:
responsive to the block stats unit selecting to separately encode, encoding, by the encode unit, the pixel components of the pixel block separately based on the respective first endpoints and the respective second endpoints.

13. The method of claim 8, further comprising:
by the block stats unit, determining means and covariances associated with the pixel components of the pixel block,
wherein encoding the pixel components of the pixel block jointly is further based on the respective mean and the respective covariances.

14. The method of claim 8, further comprising:
after encoding the pixel components of the pixel block jointly, assemble, by a packetize unit, the pixel components into one or more packets, based in part on metadata associated with the pixel block.

15. One or more computer-readable non-transitory storage media storing instructions that, when executed by one or more processors included in one or more computing devices, cause the one or more computing devices to:
store, in a buffer, a plurality of pixel blocks in an image;
by block stats unit associated with one or more first computing devices, receive a pixel block of the plurality of pixel blocks and select whether to separately encode or jointly encode pixel components of the pixel block by computing eigenvalues for the pixel components;
by a first endpoint unit associated with one or more second computing devices distinct from the one or more first computing devices, compute, responsive to selecting to jointly encode the pixel block, (i) an eigenvector for the pixel components of the pixel block based on the eigenvalues and (ii) endpoints on the eigenvector for encoding the pixel components;
by a second endpoint unit, associated with one or more third computing devices distinct from the one or more first computing devices and the one or more second computing devices, responsive to the block stats unit selecting to jointly encode the pixel block, forgo processing the endpoints and the eigenvector; and
by an encode unit, encode, responsive to selecting to jointly encode the pixel block, the pixel components of the pixel block jointly based on the eigenvector and the endpoints.

16. The one or more computer-readable non-transitory storage media of claim 15, wherein the block stats unit selecting whether to separately encode or jointly encode pixel components of the pixel block is further based on determining that one of the eigenvalues converges.

17. The one or more computer-readable non-transitory storage media of claim 15, wherein forgoing processing the endpoints and the eigenvector includes receiving information computed by the first endpoint unit and transmitting the information to the encode unit without processing the information by the second endpoint unit, wherein the information includes the endpoints and the eigenvector.

18. The one or more computer-readable non-transitory storage media of claim 15, wherein the instructions, when executed, further cause the one or more computing devices to:
by the first endpoint unit, responsive to the block stats unit selecting to separately encode, compute a first endpoint of pixel values associated with each pixel component of the pixel block; and
by the second endpoint unit associated with the one or more computing devices, responsive to the block stats unit selecting to separately encode, compute a second endpoint of pixel values associated with each pixel component of the pixel block.

19. The one or more computer-readable non-transitory storage media of claim 18, wherein the instructions, when executed, further cause the one or more computing devices to perform:

responsive to the block stats unit selecting to separately encode, encode, by the encode unit, the pixel components of the pixel block separately based on the respective first endpoints and the respective second endpoints.

20. The one or more computer-readable non-transitory storage media of claim 15, wherein the instructions, when executed, further cause the one or more computing devices to:

by a packetize unit and after encoding the pixel components of the pixel block jointly, assemble the pixel components into one or more packets, based in part on metadata associated with the pixel block.

\* \* \* \* \*